(12) United States Patent
Belcea

(10) Patent No.: US 7,773,569 B2
(45) Date of Patent: Aug. 10, 2010

(54) SYSTEM AND METHOD FOR EFFICIENTLY ROUTING DATA PACKETS AND MANAGING CHANNEL ACCESS AND BANDWIDTH IN WIRELESS MULTI-HOPPING NETWORKS

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 1266 days.

(21) Appl. No.: 11/132,907

(22) Filed: May 19, 2005

(65) Prior Publication Data
US 2006/0268792 A1 Nov. 30, 2006

(51) Int. Cl.
*H04M 1/00* (2006.01)
(52) U.S. Cl. .................. 370/338; 370/310; 370/328
(58) Field of Classification Search .......... 370/218, 370/230, 232, 235, 310, 318, 321, 322, 326, 370/328, 329, 332, 336, 337, 338, 347, 348, 370/349
See application file for complete search history.

(56) References Cited

U.S. PATENT DOCUMENTS

| | | | | |
|---|---|---|---|---|
| 6,128,282 | A * | 10/2000 | Liebetreu et al. | 370/235 |
| 6,594,273 | B1 | 7/2003 | McGibney | |
| 6,628,609 | B2 * | 9/2003 | Chapman et al. | 370/229 |
| 6,665,311 | B2 * | 12/2003 | Kondylis et al. | 370/462 |
| 6,771,966 | B1 | 8/2004 | Chow | |
| 6,807,165 | B2 | 10/2004 | Belcea | |
| 6,873,839 | B2 | 3/2005 | Stanforth | |
| 7,103,371 | B1 * | 9/2006 | Liu | 455/456.4 |
| 7,126,966 | B2 * | 10/2006 | Jokinen et al. | 370/509 |
| 7,158,484 | B1 * | 1/2007 | Ahmed et al. | 370/254 |
| 7,200,124 | B2 * | 4/2007 | Kim et al. | 370/324 |
| 2001/0002912 | A1 | 6/2001 | Tony et al. | |
| 2001/0034793 | A1 | 10/2001 | Madruga | |
| 2002/0057664 | A1 * | 5/2002 | Sarkar | 370/342 |
| 2002/0058502 | A1 | 5/2002 | Stanforth | |

(Continued)

FOREIGN PATENT DOCUMENTS

WO 0005845 A1 2/2000

(Continued)

OTHER PUBLICATIONS

J.J. Garcia-Luna Aceves, et al., "The Core-Assisted Mesh Protocol," IEEE Journal on Selected Areas in Communications, vol. 17, No. 8, Aug. 1999.

(Continued)

*Primary Examiner*—Jean A Gelin
(74) *Attorney, Agent, or Firm*—Randi L. Karpinia; Joseph J. Buczynski

(57) ABSTRACT

A method for routing data packets from a source to a destination in a wireless communication network comprising a plurality of nodes, wherein each node is in uplink-downlink association with at least one neighboring node, and wherein each node comprises a registration table identifying all downlink nodes that are associated with the node, the method comprising: sending an Open Stream message from a source node which specifies a destination node; and receiving the Open Stream message at the uplink node of the source node, wherein the uplink node relays the Open Stream message to the destination node if the destination node is registered in the registration table of the uplink node.

12 Claims, 13 Drawing Sheets

U.S. PATENT DOCUMENTS

| | | |
|---|---|---|
| 2002/0167960 A1* | 11/2002 | Garcia-Luna-Aceves .... 370/442 |
| 2003/0091010 A1 | 5/2003 | Garahi |
| 2003/0115202 A1 | 6/2003 | Jackson, Jr. et al. |
| 2003/0185166 A1 | 10/2003 | Belcea |
| 2003/0204587 A1 | 10/2003 | Billhartz |
| 2003/0227895 A1 | 12/2003 | Strutt |
| 2004/0005902 A1 | 1/2004 | Belcea |
| 2004/0032847 A1* | 2/2004 | Cain .......................... 370/338 |
| 2005/0047428 A1* | 3/2005 | Park et al. ................... 370/445 |
| 2005/0166072 A1* | 7/2005 | Converse et al. ............ 713/201 |
| 2005/0174950 A1* | 8/2005 | Ayyagari .................... 370/254 |
| 2005/0250497 A1* | 11/2005 | Ghosh et al. ................ 455/436 |
| 2006/0045011 A1* | 3/2006 | Aghvami et al. ............ 370/230 |
| 2006/0198346 A1* | 9/2006 | Liu et al. ..................... 370/338 |
| 2006/0215611 A1* | 9/2006 | Nakagawa et al. .......... 370/332 |

FOREIGN PATENT DOCUMENTS

| | | |
|---|---|---|
| WO | 0131945 A1 | 5/2001 |
| WO | 2004028070 A1 | 4/2004 |

OTHER PUBLICATIONS

PCT International Search Report Application No. PCT/US2006/015925 Dated Mar. 19, 2008—11 Pages.

C. David Young: USAP: A Unifying Dynamic Distributed Multichannel TDMA Slot Assignment Protocol Dated Oct. 21-24, 1996—6 Pages.

* cited by examiner

SYSTEM AND METHOD FOR EFFICIENTLY ROUTING DATA PACKETS AND MANAGING CHANNEL ACCESS AND BANDWIDTH IN WIRELESS MULTI-HOPPING NETWORKS

BACKGROUND OF THE INVENTION

1. Field of the Invention

The present invention relates to a system and method for routing data packets in a wireless communication network, in particular, an ad-hoc peer-to-peer multi-hopping wireless communication network, using tree dependency and time division multiple access methods. More particularly, the present invention relates to a system and method for using tree dependency and time division multiple access methods to route packets in a wireless ad-hoc peer-to-peer multi-hopping wireless communication network based on the type or class of data packets while minimizing overhead and delay and improving communication reliability.

2. Description of the Related Art

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multi-plexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with nodes of other networks, such as those on the public switched telephone network (PSTN) and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

As can be appreciated by one skilled in the art, ad-hoc multihopping networks must provide services for transporting various classes of data. Each class has its own requirements regarding the pipeline delay, jitters and integrity. Voice data are transported in network as very frequent short packets that must be delivered with very little delay. Voice packets that become very late can be dropped if such action does not affect too much the quality of sound. The stream of voice data "flows" in the network for several minutes.

Data transfer between computers (file transfer) is executed in large packets. These packets could be delivered with very large delays and jitters. The integrity of data transferred between computers is essential. Depending on the size of the data file, the transport of data over the wireless network takes, from less than one second to several seconds. Multimedia data (real time video and sound) are not restricted on pipeline delay, but require integrity of data, low jitter and synchronization of clocks at both ends of the link, in case the communication continues for long time. Multimedia data flows in network from several minutes to tens of minutes.

The class of data is used for differential handling of packets while transferred in the wireless network in order to comply with the requirements of each class. Emergency requests have higher scheduling priority than any other class of data.

Many schemes have been proposed in the literature for routing data packets using TDMA. For example, U.S. Pat. No. 6,807,165 relates to a time division protocol for an ad-hoc, peer-to-peer radio network having coordinating channel access to shared parallel data channels with separate reservation channel. Moreover, U.S. Pat. No. 6,594,273 relates to a TDMA protocol for use with wireless multihopping networks. U.S. Patent Application No. 20030185166, entitled, "Time division protocol for an AD-HOC, peer-to-peer radio network having coordinating channel access to shared parallel data channels with separate reservation channel", U.S. Patent Application No. 20030227895, "System and method for improving the accuracy of time of arrival measurements in a wireless ad-hoc communications network", and U.S. Patent Application No. 20040005902, entitled "System and method for correcting the clock drift and maintaining the synchronization of low quality clocks in wireless networks" discuss routing methods using TDMA. Moreover, systems and methods for routing data packets are discussed in the following references: Broch et al., "A Performance Comparison of Multi-Hop Ad Hoc Network Routing Protocols", Proceedings of the Fourth Annual ACM/IEEE International Conference on Mobile Computing and Networking; Young, "USAP: A Unified Dynamic Distributed Multichannel TDMA Slot Assignment Protocol"; Elliot et al., "Self-organizing, self-healing wireless networks IEEE"; Garcia-Luna-Aceves et al., "Reversing the collision-avoidance handshake in wireless networks"; Garcia-Luna-Aceves et al., "Transmission-Efficient Routing in Wireless Networks Using Link-State Information"; Garcia-Luna-Aceves et al., "The Core-Assisted Mesh Protocol", IEEE Journal On Selected Areas In Communications: Vol. 17, No. 8 (1999); ISO/IEC 8802-11 ANSI/IEEE Std 802.11. First edition 1999-00-00; Kamerman et al., "Net Throughput with IEEE 802.11 Wireless Lans", WCNC (2000); McChesney, "SUO Phase I Channel access protocol"; McChesney et al., "Optimization of an Adaptive Link Control Protocol for Multimedia Packet Radio Networks"; Ramanathan et al., "Topology control of multihop wireless networks using transmit power adjustment"; Ramanathan et al., "Hierarchically-organized, multihop mobile wireless networks for quality-of-service support"; Steenstrup, "Dynamic Multipoint Virtual Circuits for Multimedia traffic in Multihop Mobile Wireless Networks"; Tang et al., "Collision-avoidance transmission scheduling for ad-hoc networks"; Vardacas et al., "QoS Networking with Adaptive Link Control and Tactical Multi-Channel software radios". The entire contents of all patents, patent applications, and reference cited herein are incorporate by reference.

A need remains, however, for a method for routing data packets in an ad-hoc multihopping network in a manner such that efficient utilization of channel bandwidth occurs.

BRIEF DESCRIPTION OF THE DRAWINGS

These and other objects, advantages and novel features of the invention will be more readily appreciated from the following detailed description when read in conjunction with the accompanying drawings, in which:

FIG. 10 shows the first of successive steps (show below in FIGS. 11-13, successively) of a process of minimizing the pipeline delay in an example network.

DETAILED DESCRIPTION OF THE PREFERRED EMBODIMENTS

The present invention provides a method for routing a data packet from a source node to a destination node in a wireless communication network comprising a plurality of nodes, wherein each node is in uplink-downlink association with at least one neighboring node, and wherein each node comprises a registration table identifying one uplink and all downlink nodes that are associated with the node. The method comprising: sending an Open Stream message from the source node which specifies a destination node; and receiving the Open Stream message at the uplink node of the source node, wherein the uplink node relays the Open Stream message to the destination node if the destination node is registered in the registration table of the uplink node, and wherein, if the destination node is not registered in the registration table, the uplink node relays the Open Stream message to its own upstream neighboring node, which checks its registration table for the destination node.

The present invention also provides a method for managing channel access by nodes in a wireless communication network, the method comprising monitoring by at least one node in the network of data transmissions and intent-to-transmit messages by neighboring nodes; determining by the at least one node of the identity of those time slots in use by the at least one node and by the neighboring nodes and those time slots not in use by the at least one node and the neighboring nodes; and broadcasting by the at least one node of information including the identity of used and unused time slots to the other nodes, such that the other nodes can chose an unused time slot for packet transmission.

Moreover, the present invention provides a method for efficient utilization of channel bandwidth by nodes in a wireless communication network. The method comprises recording in a utilization table by a node of the identity of the time slots allocated by the node for data packet transmission, the identity of the time slots used by neighboring nodes for packet transmission, and the identity of the time slots at which the neighboring nodes receive packet transmissions; and broadcasting the utilization table to neighboring nodes, wherein the neighboring nodes receiving the broadcast update their own utilization tables in view of the received utilization table, and wherein the utilization table at each node is usable by the node for selecting unused time slots for transmitting data packets.

Figure 1:
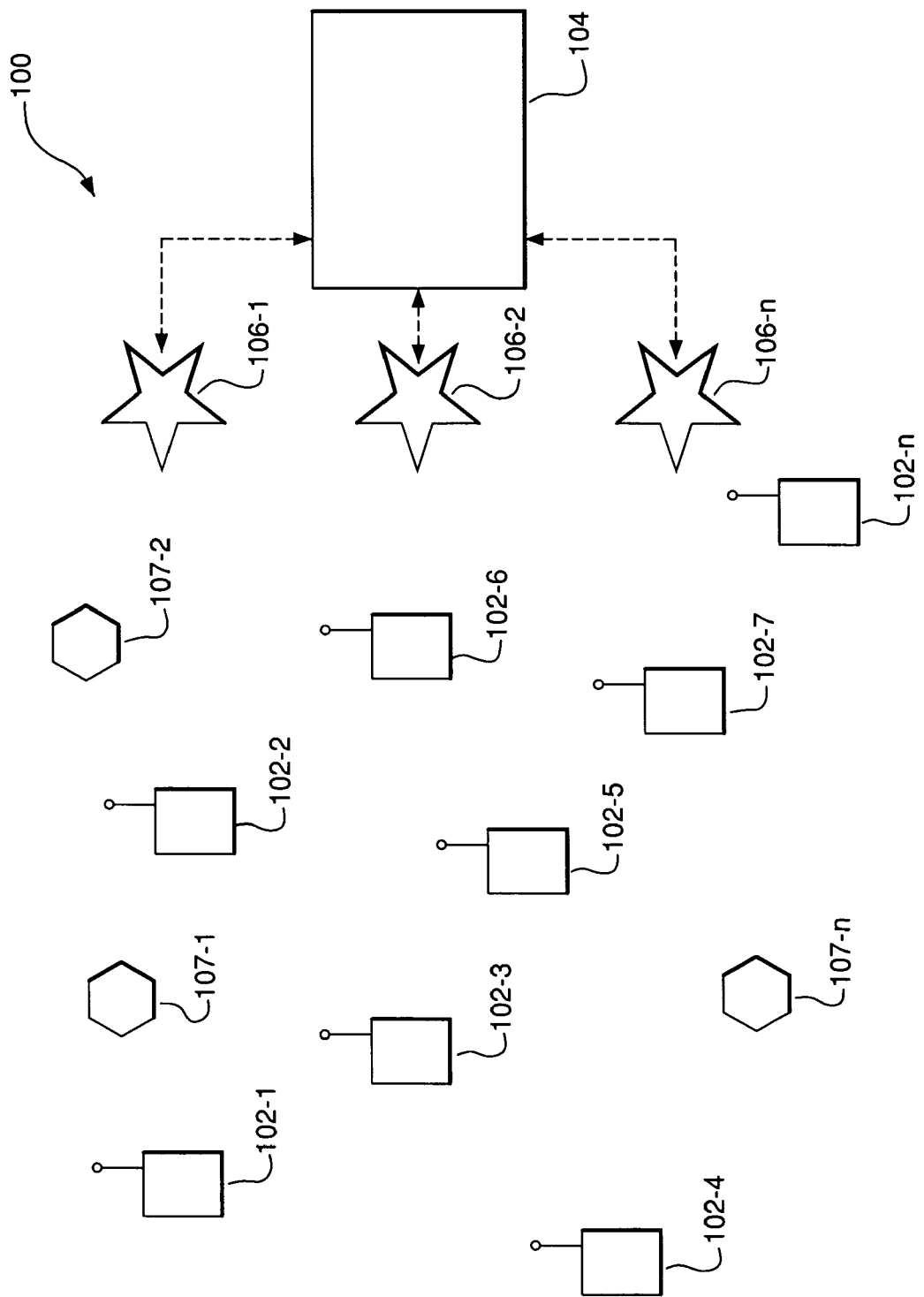
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. For purposes of this application, the term "ad-hoc network" refers to a network where the topology and the behavior of the nodes are arbitrary. Specifically, the network 100 includes a plurality of mobile wireless user nodes 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or routers 107) for routing data packets between other nodes 102, 106 or 107 for providing network connectivity, in case the density of mobile nodes 102 is too small. The router devices could be fixed, mobile or transportable, but the positioning capability has no merit for the method. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as routers forwarding data packets from the source node to the destination node, as described in U.S. Pat. Nos. 7,072,650, 6,807,165, and 6,873,839, referenced above.

Figure 2:
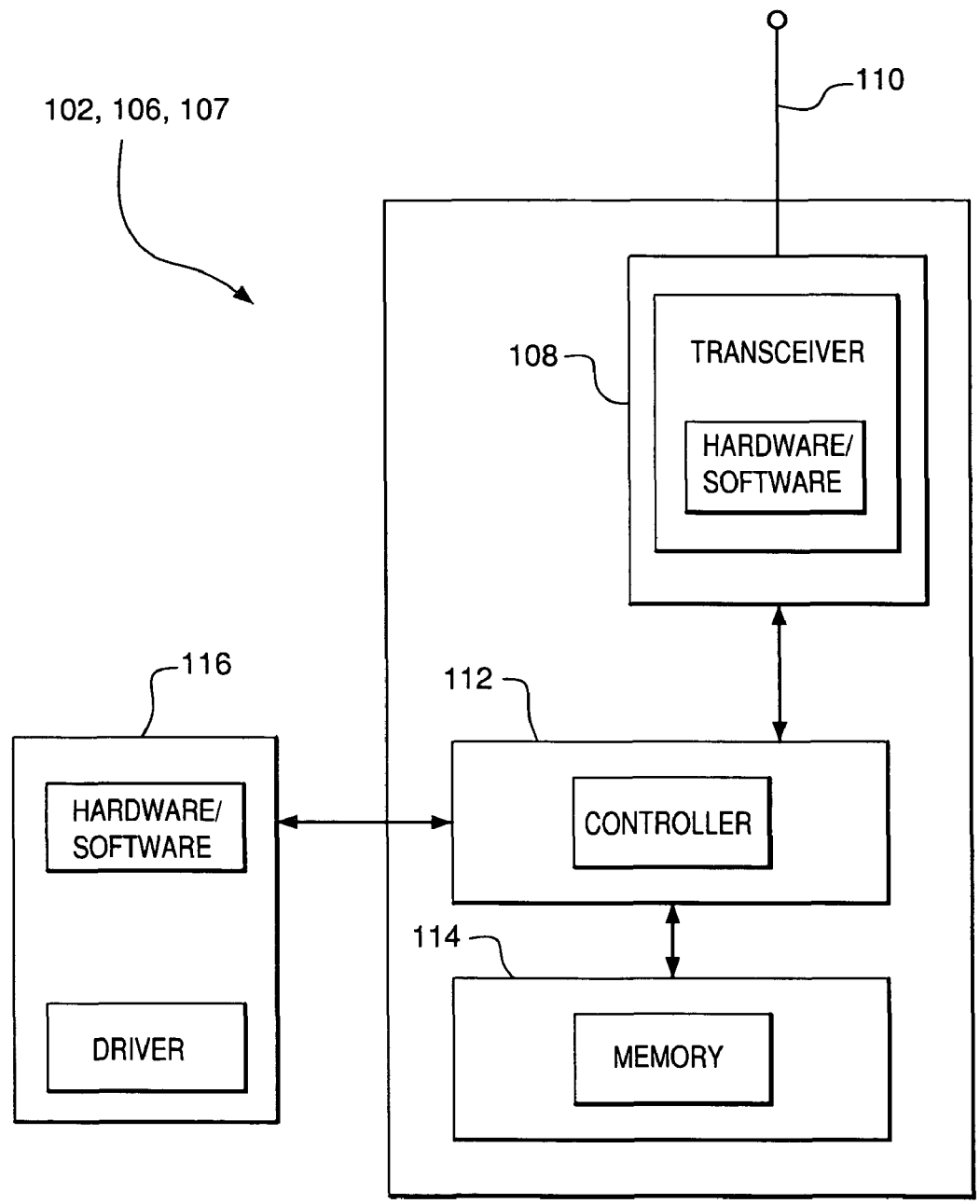
FIG. 2 is a block diagram illustrating an example of a node employed in the network shown in FIG. 1.

As shown in FIG. 2, each node 102, 106 or 107 includes a transceiver, or modem 108, which is coupled to an antenna 110 and is capable of receiving and transmitting signals, such as packetized data, to and from nodes 102, 106 or 107, under the control of a controller 112. The packetized data can include, for example, voice, general data or multimedia information, and packetized control signals, including information for updating the network topology.

Each node 102, 106 and 107 further includes a memory 114, such as a random access memory (RAM) that is capable of storing, among other things, routing information pertaining to itself and other nodes in the network 100. As further shown in FIG. 2, nodes 102 and 107, can include a host computer 116 which may consist of any number of devices, such as a notebook or palm computer, mobile telephone unit, mobile data unit, or any other suitable device. Nodes 107, that perform only routing, do not need an associated computing device for operating in the network. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. It is noted that on the following description, the term "node" is used severally, and can refer to any of the nodes 102, 106 and 107 as described above, as appropriate.

Figure 3:
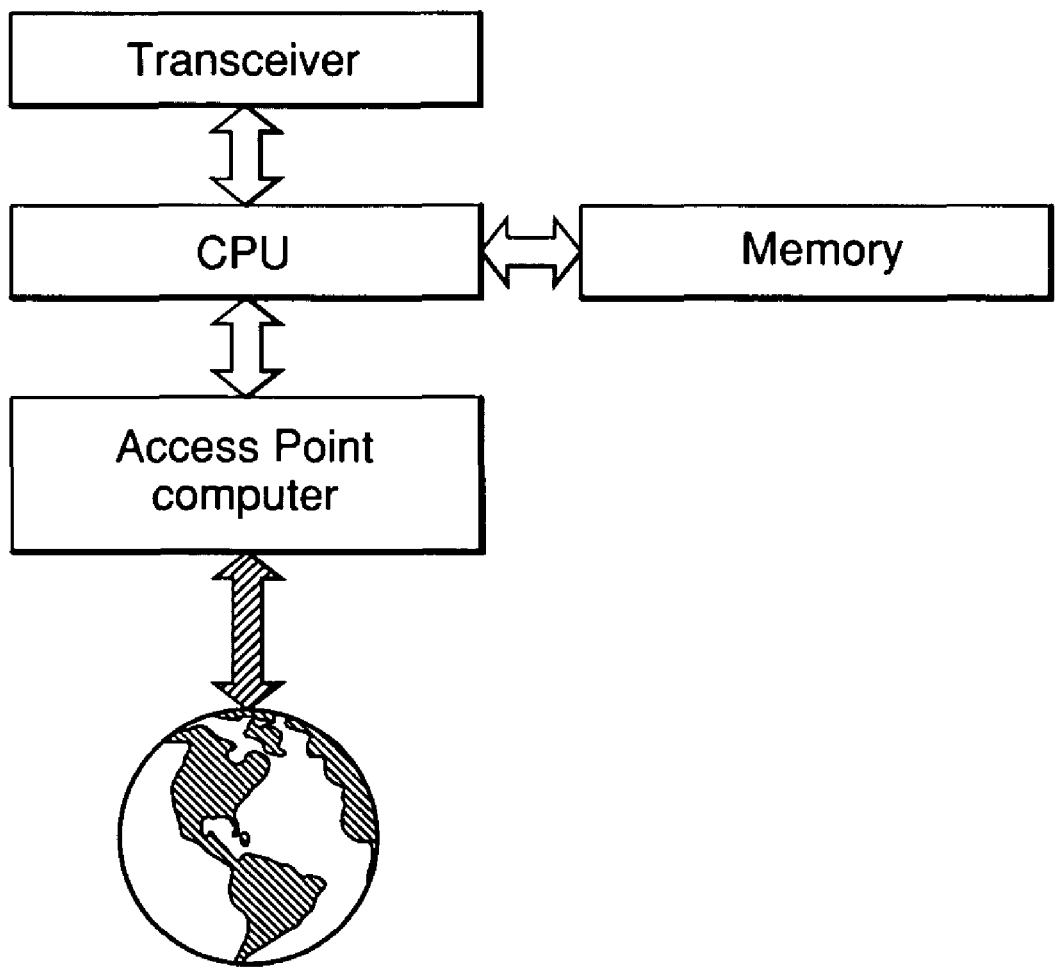
FIG. 3 is a block diagram illustrating an example of a Subscriber Device connected to an Access Point computer.

Ad-hoc multi-hopping networks typically have three types of nodes: Mobile Subscribers, Wireless routers, and Access Points. As depicted in FIGS. 2-3, which are discussed in more detail in the "Detailed Description" below, a Mobile Subscriber device has a transceiver, a CPU component, and a memory component. Moreover, the device can be connected to a host computer to an Access Point Computer (as depicted in FIG. 3). The transceiver, in this regard, is the radio interface of the subscriber device, which is responsible for transmitting and receiving digital signals. The CPU component ensures the execution of all command and control operations required for correctly performing wireless data transfer with other Subscriber Devices, Wireless Routers, or Access Points. The memory component includes the software that controls the operation of the transceiver for transferring data between the transceiver and the host computer. The high-speed bus provides the capability to connect the device to portable or palm computers.

A Wireless Router is a device that is typically used for providing connectivity when wireless nodes are sparsely distributed. The deployment of Wireless Routers, in this regard, ensures that at least a minimal coverage is provided even if the network has only one Subscriber Device. Wireless Routers are typically used, in this regard, for retransmitting data over a wireless interface.

An Access Point device is a device that provides the bridge between the wireless network and land networks (such as, for example, PSTN, Internet, LAN, and WAN). Access Points that support wireless interfaces are similar to Subscriber Devices and Wireless Routers, in this regard, in that they have a transceiver, a CPU component, and a memory component. An Access Point Computer can be connected to the world networks, as depicted in FIG. 2, with appropriate wired or fiber connections. In this regard, Subscriber Devices can move freely within serviced areas, while the Wireless Routers can be fixed, transportable or mobile.

Ad-hoc multihopping networks differ from cellular networks in that the members of ad-hoc networks (e.g., Subscriber Devices, Wireless Routers and Access Points) provide relay services to all neighbors, thereby ensuring that all data packets generated at a source are received to a destination. This relaying capability extends the coverage areas associated with Access Points to much larger distances than would exist in a cellular system. Moreover, the enhanced coverage area is achieved at a low cost. In this regard, because the devices in an ad-hoc multihopping network use very small amounts of transmit power, the devices can be operated for a long time on batteries. Moreover, the fact that the devices use small amounts of transmit energy makes them suitable for operating in non-licensed frequency bands.

Ad-hoc multihopping networks also differ from cellular networks in network architecture. In a cellular network, a base station is the central point and the coordinator of activity of the whole network (called "the cell"). In this regard, because cellular communication occurs between one node (the base station) and many other nodes (the nodes), one frequency can be used for transferring data from the base station to the network of nodes and another frequency can be used for transferring data from nodes to the base station. The manner of such cellular communication, in this regard, is similar to communications using satellites. From this perspective, a cellular network has an asymmetric architecture, wherein the base station transmits in one frequency while all subscribers transmit in a different frequency. This architecture and the large difference between uplink and downlink frequencies allow the Base Station, and Mobile Subscriber to simultaneously transmit and receive data.

Nodes in ad-hoc multihopping networks (except source and destination nodes) should operate as repeaters, receiving and retransmitting data packets. Because most nodes operate on batteries, this mode of operation requires the identification of routes between the source and destination, which complies with some optimization and operation criteria as using the smallest energy. For assuring the multi-hopping capability, all nodes must transmit and receive on the same frequency, because each node could be source, destination and intermediate node simultaneously. For this reason, a node operating in an ad-hoc multihopping network generally may not be able to transmit and receive in the same time. It must alternate between transmitting and receiving states.

Conventional Methods

One common method used in ad-hoc multihopping communication is CSMA/CA. This method was developed for military applications and requires an exchange of Ready To Send (RTS) and Clear To Send (CTS) messages for setting the communication parameters. Once the RTS-CTS "handshaking" is successful, data is transferred using the characteristics that were decided during the handshake. Following data transfer, the receiver of data can reply with an "Acknowledgment" which identifies the correctness or incorrectness of the received data. The CSMA/CA method, in this regard, requires that each node listen to possible radio communication before transmitting data (Carrier Sensing).

Time Balance

The communication between two nodes in an ad-hoc multihopping network requires an exchange of control or configuration messages. These configuration messages provide the "handshaking" that assure that the transmitting node and the receiving node are tuned on to the same frequency channel, using the same spreading codes and the same modulation. After the communication of data is completed, the receiving node can confirm the quality of the reception via another transmitted control message.

The method adds, to the main data traffic, an amount of overhead information that may be acceptable when data packets are very large and when the delay along the multihopping route is not important. However, the situation can be different when the communication is interactive and when it requires very small pipeline delay.

For example, Voice Over Internet Protocol (VoIP) is an interactive service which requires small delay for an end-to-end communication. This application uses an analog to digital converter for digitizing a sound, a pipe for transferring data from source to destination, and a digital to analog converter for regenerating the sound.

The total delay between the moment when the sound is generated at source and the moment when the sound is regenerated at destination depends on the buffering time of a data packet and on the delay at each node along the delivery route. The "buffering time" of a data packet, in this regard, is the time needed for collecting data for one packet. Reducing the duration of the packet has as effect to reduce the buffering delay per packet, but increases the number of packets per second with the corresponding increase of the overhead. The increased amount of overhead does not affect the communication as long as it is smaller than the amount of data a node can handle. In Equation 1, the left term is the total number of voice data packets passing through a node and the right term is the largest number of packets a node can handle. The node provides services to n routes and each route has a traffic of $T_t$ bytes per second. The size of traffic flow depends on the compression method of voice data. For example, for ISDN using μ or A law compression, the traffic is 8,000 bytes per second. The number of packets per second depends also on the size of the packet $p_s$ in bytes. The overhead $o_t$ is measured in seconds. It includes the duration of all operations associated to the transmission of one packet. The data rate ρ is measured in burst bytes per second. The $C_r$ is the rate of successful completion of transferred packets. A node along the route receives and then transmits the data packets therefore the node can transmit only half of the time. The congestion condition is:

$$\frac{nT_t}{p_s} \leq \frac{.5C_r}{\left(\frac{p_s}{\rho} + o_t\right)} \quad \text{Equation 1}$$

It results:

$$p_s \geq o_t \frac{nT_t\rho}{.5C_r\rho - nT_t} \quad \text{Equation 2}$$

Equation 2 provides the lower limit of the packet size $p_s$ that allows a node to operate in specified conditions. It means that for each set of values of the communication overhead as the number of supported voice connections, the traffic flow, and the data rate, is associated a minimal size of the data packet. If the packets are smaller than the specified limit, the node cannot operate, without dropping some of the received packets.

On the other hand, for real time services, the delay along the path with N hops must be smaller than the acceptable delay $d_p$:

$$\frac{\left(\frac{p_s}{\rho} + o_t\right)}{C_r}N + \frac{p_s}{T_t} \leq d_p \quad \text{Equation 3}$$

In Equation 3, the term $$\frac{p_s}{T_t}$$

represents the buffering (encoding or decoding) time of the packet.

$$p_s \leq \left(\frac{C_r d_p - o_t N}{NT_t + \rho C_r}\right) T_t \rho \quad \text{Equation 4}$$

Equation 4 provides the upper limit of the packet size for assuring that the delay along a route with N nodes is smaller than allowed delay $d_p$.

A network providing VoIP service can work only if the conditions in Equation 2 and Equation 4 are simultaneously verified. For example, a network carrying voice data from PSTN (8000 bytes per second) with all hops operating at 6 Mbits per second, a completion rate of 90%, an overhead of 2,200 μs per packet, supporting 5 duplex connections over 10 hops with a delay not larger than 100 ms, has to have the data packet size between 513 bytes and 540 bytes. In this case, the transmission of one data packet takes about 700 μs, while the overhead for performing the transmission is three times larger.

As it can be noticed, the Equation 2 sets the lower limit of packet size as a function of number of active voice routes in some particular node. In a multihopping ad-hoc network, the AP is the node that concentrates all calls therefore it supports all circuits open at any time in the network. Equation 4 sets the upper limit for the packet size as function of number of hops along the path of a route. For large values of n and N, the two limits of the packet size may be contradictory, which is the indication that the network may not be not able to work in specified conditions.

Data Stream and Data Path

A method for planning and controlling the transfer of data packets from a source node to a destination node in an ad-hoc multihopping network is provided. In particular, an ad-hoc multihopping network builds a sequence of nodes (collectively, forming a path) that is used for transferring data between the source and the destination. The term "route" is defined herein to identify the sequence of nodes that make the directed path from a source node to a destination node. The term "stream" is defined herein to identify the data that travels along the route. The phrase "route data" is defined herein to be the data describing the route as a sequence of nodes and some specific properties of the path or sequence of nodes, and the phrase "stream data" is defined herein to be the payload that is carried from the source to destination.

All intermediate nodes along the route connecting the source to destination receive stream data from one node and transmit stream data to another node. The phrase "upstream node" is defined herein to be the node from where stream data is received and the phrase "downstream node" is defined herein to be the node to which stream data is transmitted. The source of data does not have an up-stream neighbor, while the destination does not have a down-stream neighbor. Depending on transmit energy and propagation of radio waves, one node can receive signals from more than one up-stream and from more than one down-stream nodes.

Transmit Energy and Network Connectivity

In ad-hoc multihopping networks using the protocol described in U.S. Pat. No. 7,206,294, entitled "Movable Access Points and Repeaters for Minimizing Coverage and Capacity Constraints in a Wireless Communications Network and a Method for Using the Same", issued on Apr. 17, 2007, the contents of which is incorporated herein by reference, the general rule is that if a node can hear another node, it must reply with enough energy so it can be heard back. This requirement is achieved through the network cooperation that requires informing the neighbors about the level of transmit energy and the level of environmental noise. Each change in the level of the transmit energy or the level of measured noise are immediately communicated to the network for allowing the neighbors to properly compute the transmit energy in case they have to transmit a data packet.

Although the reciprocal reception is desirable, it may not be achievable all of the time, due, for example, to asymmetries caused by large variations in equipment characteristics or strong local noise. In such cases, the negative effect is limited to time slices where the transmissions of hidden nodes occur and any negative effects of interference are identified and avoided.

Time Division and Communication

Figure 4:
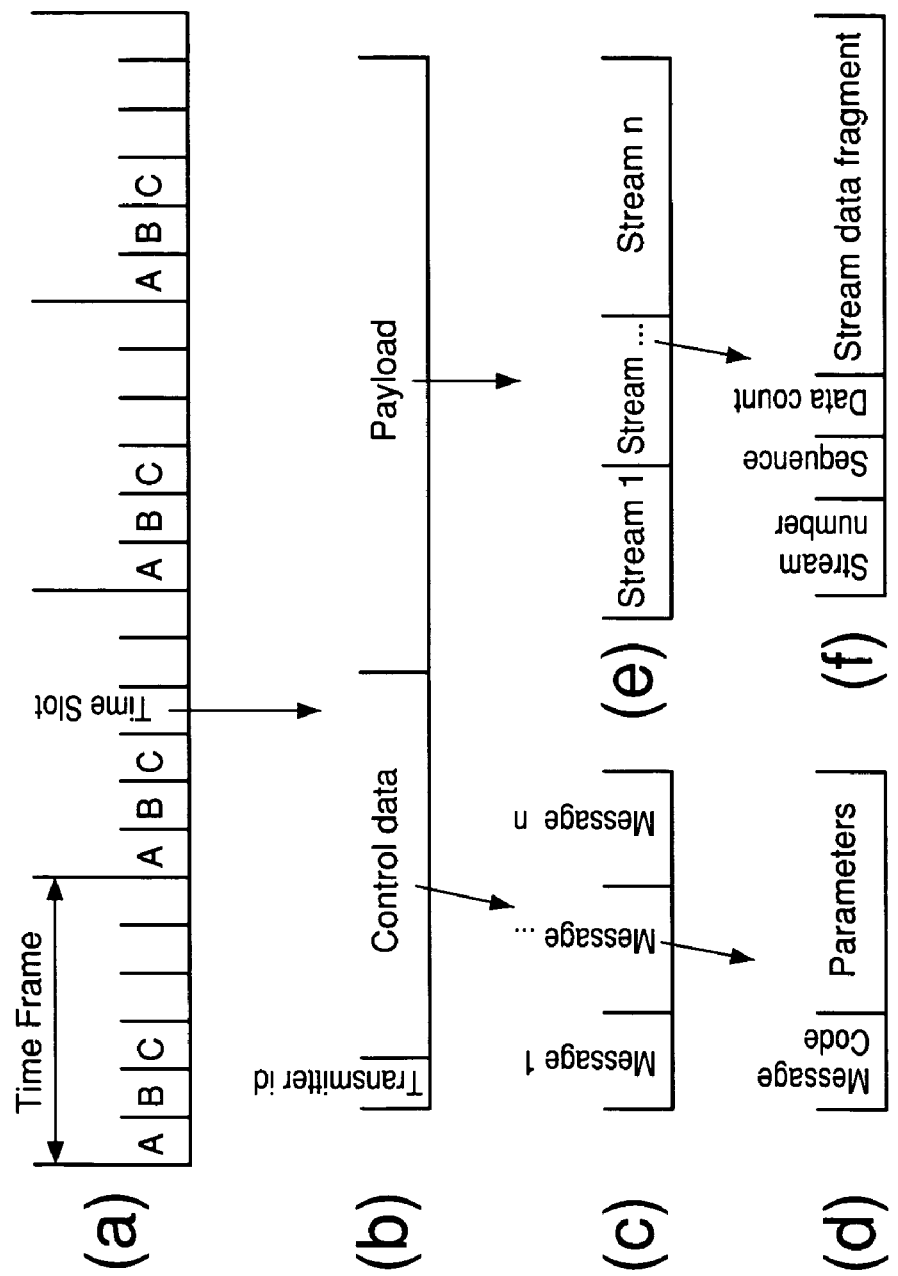
FIGS. 4(a) through 4(f) illustrate the concept of communication according with the present invention.
Figure 5:
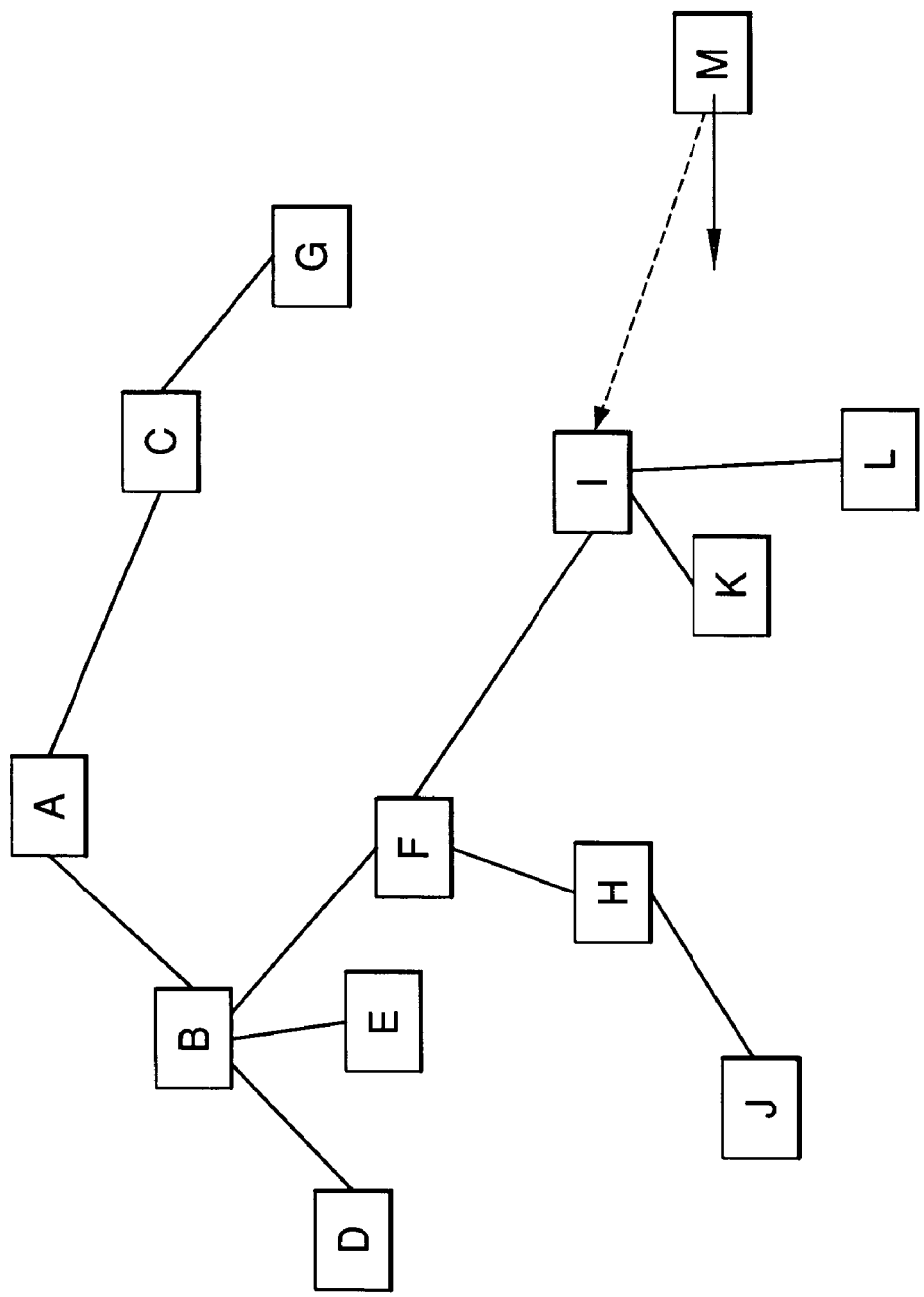
FIG. 5 is a block diagram illustrating an example of a network comprising access point A and regular nodes B-M, and the tree dependency in the depicted network in accordance with one embodiment of the present invention.

The concept of communication in this TDMA method is presented in FIG. 5. FIG. 4 (a) shows that at a node, the time is divided into timeframes, with each timeframe being divided in timeslots. During one timeslot, a terminal transmits only one structured data packet as shown in FIG. 4 (b). At the beginning of the data packet, the identification of the station performing the transmission is transmitted. This is followed by the control data, then by the payload. Those skilled in the art will easily identify that at any data packet either the control data or the payload may be missing from a transmitted data packet. The Control data may contain several Control messages that are used for directing the traffic in the network and for communicating to neighbor's information about network topology as shown in FIG. 4(c). Each Control message has a message code and associated parameters, as shown in FIG. 4(d). The payload may contain one or more Data Streams as shown in FIG. 4 (e). In FIG. 4 (f) is shown that each Data Stream packet has a Stream number, a fragment sequence number, a count of the data fragment size and the data fragment itself.

Broadcast Communication

The components of ad-hoc multihopping networks use radio frequencies for communicating with one another. Because the components of the network move continuously, each node must use omni-directional antenna, meaning that any transmission is a broadcast that is received by all neighbors that are close enough.

Example of a Ad-Hoc Multihopping Network

FIG. 5 depicts an example network illustrating the tree routing concept of and embodiment of the present application. The Time Division of the example network has 10 timeslots (numbered from zero to nine). Moreover, node A of the example network represents an Access Point, which provides the connection to land networks.

Table 1, below, illustrates the neighbor list at each of the host nodes of the example network of FIG. 5. The list shows, for example, that node E can receive radio signals from nodes B, D and F. Moreover, by looking at nodes B, D and F, one can find out that these nodes can receive radio signals from node E.

The lines between nodes in FIG. 5 show some associations that were made between nodes as a result of the registration process described in the next paragraph. These associations created a representation of the network as a tree graph with the root at the access point. Considering any two connected nodes from this graph, the node closer to the access point is called the "uplink" while the other node is called the "downlink." Because the network graph is a tree, any node, excepting the access point, has only one uplink neighbor. Also, all nodes, excepting those located at the periphery of the network, have at least one downlink neighbor.

TABLE 1

| Host | Neighbor 1 | Neighbor 2 | Neighbor 3 | Neighbor 4 | Neighbor 5 |
|------|------------|------------|------------|------------|------------|
| A | B | C | | | |
| B | A | D | E | F | |
| C | A | G | | | |
| D | B | E | | | |
| E | B | D | F | | |
| F | B | E | H | I | K |
| G | C | | | | |
| H | F | K | J | | |
| I | F | K | L | M | |
| J | H | | | | |
| K | I | L | | | |
| L | K | I | M | | |
| M | I | L | | | |

Registration and Heart Beat

In FIG. 5, node M is approaching the network. At the shown moment, node M can receive signals from nodes I and L (and vice versa). From these messages, node M finds out that node I is closer to the Access Point than node L and selects it as uplink.

For achieving registration with the Access Point, node M transmits the control message Registration Request specifying that "node M requests node I to register M".

Node I and L receive the control message, but only node I transmits another Registration Request with the content "Node I requests node F to register node M." The message is received by nodes M, F and K. Node M knows now that its request has been received and it is now registered. If node M does not hear the message being transmitted by node I, it supposes that a propagation problem happened and submits again the same control message during the next timeframe.

The message transmitted by node I is also received by nodes K, L and node F, but only the latter of which should react. Because the message requests node F to register node M, node F transmits the message "Node F requests node B to register node M." From all nodes receiving the signal, only node I and B are interested in this message. Node I knows that the message it transmitted before was received correctly and removes the message from its retransmission queue. Node B submits a similar registration message to node A. Since node A is the "end of the line", it transmits the message "Node A requests nobody to register node M." The message has as scope to let node B know that the message regarding the registration of node M has been received and processed.

During all this time, node M preferably has exchanged Clock Sync messages with node I, has synchronized its clock, and has selected a timeslot (TS) that it will be using when addressing the network. When node M makes the reservation of the timeslot and communicates the intent to transmit during that TS, all neighbors receiving the message update and transmit their table of timeslot utilization.

All nodes monitor the transmissions of the network recording the time when the last message has been received from each neighbor. Periodically, those neighbors from which no message was received for some long time are removed from the neighbor tables. For maintaining the network connectivity, those nodes that are present in geographical area of the network but have no data to transfer, preferably transmit periodic Heartbeat messages. These messages have a similar functionality to the Registration Request, maintaining the list of registered downlink neighbors.

If node M does not have any data to transmit, it can go to sleep, waking up from time to time for transmitting the Heartbeat message and for listening to network activity for identifying if it is not solicited to participate in data transfer.

Network Description

The Registration Request message is also transmitted every time a node changes its uplink neighbor. The Registration Request from node M in FIG. 5, for example, contains the information regarding the node requesting the registration, the node requested to register and the node to be registered. In the above example, the meaning of the message is "M requests I to register M". Selection of an uplink can be based on any suitable metric, such as, for example, on a metric that includes the metric of the uplink node, the path loss to the uplink node, the congestion at the local node, and the channel quality.

When node I receives the message, it builds its registration tables. In this table, the new node M is recorded as a "branch". From previous received messages, node I has also recorded K and L as branches.

When F receives the Registration Request "I requests F to register M", it adds M as a leaf to the branch of I. After this operation, the registration tables at F should show the branch I with leaves K, L, M and branch H with leaf J.

When B receives the Registration Request "F requests B to register M", it adds M to the branch of node F. The registration tables at B are now: branch F has leaves H, J, I, K, L, M, branch E and branch D have no leaves.

Finally, when A receives "B request A to register M", it ads M to the branch of B. The registration tables at A shows now that branch B has leaves D, E, F, H, J, I, K, L, M and branch C has leaf G.

The simple rule is that a node requesting registration of anybody is a branch while the registered nodes are leaves on that branch.

The Registration update message is used for maintaining network connectivity or for bulk registration. Supposing F moves closer to A, it may change its uplink from B to A. In this case the Registration update message has the meaning "F requests A to register 6 nodes H, J, I, K, L, M". It will make A to remove F and all mentioned nodes from the B branch, where they were located before, and create the new branch F with specified leaves.

If F moves away from B and selects E as uplink, for example, F will send a similar request to E. Then E will submit "E requests B to register 7 nodes F, I, H, J, K, L, M". There is no need for B to submit a registration to A, as such message does not provide any new information to node A.

Node Removal

A node keeps two tables with information about its neighbors: a Neighbor Table that contains information about the neighbors from which the node receives signals and a Registration Table that contains information about neighbors that are in the network and not necessarily in direct radio contact with the node.

Entries in the Neighbor Table are preferable removed when a node does not receive any signal from a neighbor for some long time. A neighbor that is removed from the neighbor table is not necessary removed from the registration table, however, preferably a node is removed from the Registration Table when a signal is received showing that the node is registered with some other uplink that is not in the registration table, or after not receiving any Heartbeat mentioning the node for some time.

Open Stream

When a node has to send data to another node, it submits first the Open Stream message. The request for opening the steam identifies the source node, the destination node, the stream number and the class of requested service.

Suppose that in the network presented in FIG. 5, node M has to send data to node J. Node M checks its registration table for the destination identification. Since the destination is not in the registration table of node M, it transmits the Open Stream message. The meaning of the message is "M requests to build a route from M to J as stream 5." The message does not mention node I as destination of the message, but node I knows that it has to solve the request because it has node M (the transmitter of the message) as a branch in its registration table. Because node I does not have J in its registration table either, it transmits the same request to the upstream neighbor. Node F receives the message and finds both source M and destination J in its registration table.

If the destination node is not in the network, the Open Stream message travels towards the access point that submits the request to the land network. In such case, the access point designates itself as the pseudo-destination for the wireless route.

In our case, node F repeats the Open Stream message. The request is received by node H, which identifies that the request is coming from its uplink and the destination J is in its registration tables. For this reason, node H repeats the Open Stream request. Node J receives the request and identifies itself as the destination of data. It repeats the request for informing node H that the message has been received and processed.

The retransmission of Open Stream from the source to the destination node has as scope to inform each node that it will be involved in transporting data for the specified stream. When receiving the message, each node builds the buffer system for storing data packets associated to the stream when they will arrive and selects the proper timeslot for transmitting data to the next node along the route.

If any node identifies that it does not have enough resources for providing the service, it replies with Route Failure. The message travels in network from the node failing to build the route to the source node.

During the process of building the route, if resources are scarce, some of the active streams could be cancelled for allowing emergency streams to operate.

Minimal Delay Along the Route

The numbers in front of each node in Table 2 below, represent the time slot number that is used by each node for communicating with the neighborhood. The network presented in this example has a timeframe with 10 timeslots numbered from zero to nine.

TABLE 2

| Host | Neighbor 1 | Neighbor 2 | Neighbor 3 | Neighbor 4 | Neighbor 5 |
|---|---|---|---|---|---|
| 0-A | 1-B | 2-C | | | |
| 1-B | 0-A | 3-D | 5-E | 7-F | |
| 2-C | 0-A | 1-G | | | |
| 3-D | 1-B | 5-E | | | |
| 5-E | 1-B | 3-D | 7-F | | |
| 7-F | 1-B | 5-E | 0-H | 4-I | 3-K |
| 1-G | 2-C | | | | |
| 0-H | 6-F | 3-K | 1-J | 4-I | |
| 4-I | 7-F | 3-K | 2-L | 8-M | 0-H |
| 1-J | 0-H | | | | |
| 3-K | 4-I | 2-L | | | |
| 2-L | 3-K | 4-I | 8-M | | |
| 8-M | 4-I | 2-L | | | |

According with this table, when the Open Stream for the stream travels from node M to node J, the nodes along the route are using the following time slots: 8-M, 4-I, 7-F, 0-H, and 1-J. In the case presented in Table 2, the total delay along the route from M to J is 13 timeslots.

The delay along the route can be substantially reduced if each intermediate node retains the data packet for very short time. While the Open Streams message travels through the network, the nodes along the route can select different timeslots for minimizing the time for which the stream data is retained at the node. The control message ALLOCATE_TS is used for letting the neighborhood know that the node transmitting the message changes the transmission timeslot.

Because it is involved in the route starting at M, node I monitors the changes of timeslot allocation of node M and makes decisions for reducing the delay time along the route. Node I receives signals from F, K, L and M that report receiving signals in timeslots 7, 1, 5, 0, 4, 3 (from F), 2, 3, 4 (from K), 2, 3, 4, 8 (from L), and 2, 4, 8 (from M). It results that only timeslot 6 is available for node I. Since node I receives data from M in timeslot 8, changing the transmission timeslot from 4, that is currently used, to timeslot 6 does not reduce the pipeline delay, but increases it with 2 mode timeslots. Therefore, node I decides not to change the transmission timeslot.

Node F receives signals from B, E, H, I and K. The occupancy of timeslots received from them is 1, 0, 3, 5, 7 (from B), 5, 1, 3, 7 (from E), 0, 6, 3, 1, 4 (from H), 4, 7, 3, 2, 8, 0 (from I), 3, 4, 2 (from K). The only available timeslot at F is 9. Changing the transmit timeslot for 7 to 8 will add one more timeslot to the pipeline delay, therefore node F should not change the currently used timeslot planning.

The next node along the route is H. It receives signals from F, K and J. The occupied timeslots are 7, 1, 5, 0, 4, 3 (from F), 3, 4, 2 (from K), 1, 0 (from J). The available timeslots at H are then 5, 6, 8 and 9. Since the previous node on the route, F, is transmits during TS 7, relocating node H from timeslot 0 to timeslot 8 would reduce the total length of the delay with two TS. Therefore, H allocates a new TS by submitting the ALLOCATE_TS for timeslot 8.

Because node J only receives data, the timeslot when it transmits is not important for the stream delay, therefore it does not perform any analysis for changing the TS.

After relocating node H to the new timeslot, the situation along the route is: 8-M, 4-I, 7-F, 8-H. It means that a pipeline delay for the considered stream is 10 timeslots, down from 13 timeslots.

Because in this protocol, more than one control messages can be transmitted at once, the allocation of new timeslots along the route is executed in the same time with the transmission of the Open Stream message.

Data Traffic Along Multi-Route

Before entering the wireless network, data is split in fragments. Streams carrying real time data, as voice, for example, are very sensitive to pipeline delay. Due to network mobility, when narrow frequency channels are used, signal fading becomes a very important issue. In such case, unique links along the route are not appropriate, as retransmission of a packet implies extra delays along the pipeline. Such delays, once created, can be removed only by dropping packets that are "too old" to be transmitted. Streams carrying data in classes that are not sensitive to delay should drop data packets only if the buffers are full.

In this particular network, nodes I, F and H, that are part of the route associated to the same stream, can hear each other. It means that the packets transmitted by node I with the intent to be received by node F, are also received by node H. Therefore, node H can have already received the data packets when F retransmits them. The redundancy existent in this case is used for improving the reliability of the communication. The probability that H receives correctly a particular packet is much higher when the same packet is transmitted by two different sources at different times. It means that the node I can consider the transmission of a packet as successful, when it receives a signal either from node H or from node F that the data packet is retransmitted.

Redundancy as the one presented here is not always available. When the communication requires increased reliability, another kind of redundancy can be created.

Let us suppose that node M travels at very high speed in relation with node I. This fact may cause node I to frequently fail to correctly receive data packets transmitted by node M. In such case, node I may request a common neighbor, to repeat the signals transmitted by node M. For the same conditions, M may frequently fail receiving messages transmitted by I for F that confirm the correct reception of messages transmitted by M. In such case, node M may also request a common neighbor to help repeating those messages transmitted by I.

The Repeat Request is a control message that specifies the identification of the neighbor that should be repeated. The meaning of the Repeat Request transmitted by node I is: "Node I request repeating messages from node M". The Repeat Request message transmitted by node I is received by nodes F, K, L and M. Since node L can receive signals from both stations, it allocates a timeslot for repeating messages transmitted by M. From that moment, every time when L receives a message from M, it repeats the message in the specially assigned timeslot. All stations receiving the Repeat Request message that do not have both I and M as neighbors, should ignore the message. Station L does not seek confirmation from the destination for messages it transmits as a repeater. If both M and I request repeating the neighbor messages, they will receive twice each message, once from the route partner and once from the repeater. If both nodes M and I have requested repeating each other messages, they can hear the confirmation of reception as a repeated message.

If M requests repeating messages from 1 when it is closer to K too, both L and K can should repeat the same messages. If the redundancy is too high, the node that have requested the repetition should submit Stop Repeating specifying the TS during which is received the weakest repeated message. Usually, the Stop Repeating is issued when the combined the reliability of reception from remaining repeaters is better than 95%.

Congestion Control

A node identifies "congestion" as lack of available timeslots within the timeframe. It could happen if too many nodes that require data transfer are in a very small geographical area.

One method for controlling the congestion is to limit the maximum allowed transmit power of a node. Initially, the node can use all the power the transmitter can develop, if it is needed. The level of power is computed based on the path loss and noise at each neighbor from which messages are received. If a node identifies that less than a specified limit (10-15% for example) of timeslots are available due to utilization or interference, it may decide to lower the maximum allowed transmit power. The change is performed slowly, one dB every few timeframe, at random, until the power is reduced to a level that allows a reasonable number of time slots to remain available for use. Since the action is taken slowly, at random moments in time, all neighbors have the opportunity to lower their maximum power almost in the same time. The limit of the maximum allowed transmit power can be slowly increased with one dB every few timeframes, if a node identifies that the number of available timeslots is larger than a specified limit.

If the limit of the maximum allowed transmitting power is as small as the minimum transmit power of the transmitting node and there are still not enough available time slots, the node can use network stratification for providing services.

A node that has lowered the power to the minimum level may request network stratification by submitting the message Network Stratum that specifies the number of levels of stratification and the level selected by the node submitting the suggestion. Initially, the number of strata is computed from the size of neighbor table and the maximum number of timeslots within a timeframe. If the congestion persists, the number of levels is further increased with one every second, for example. The node suggesting the stratification selects initially at random a stratum and transmits only on it. If a network has two strata for example, nodes choosing to operate on stratum zero, will transmit only during the timeframes with even number, while nodes choosing to operate on stratum one, will transmit only during the timeframes with odd number. In other words, the stratification process splits the timeframes in classes of residuals. Each node receiving the Network Stratum from a neighbor can decide to join the stratification for timeslots not carrying real-time streams (voice) and transmit during every timeframe in timeslots carrying real-time streams. The access points are one category of nodes that do not join the stratification of the network, regardless the nature of carried streams. If a node decides to join the stratification, it should use the highest number of strata it has received from neighbors. A node decides to join the network stratification if its maximum allowed transmitting power is the same as the minimum power of the node transmitter and the availability of timeslots is reduced.

A node operating on a stratum transmits the Network Stratum message every time when it transmits the timeslot utilization or the interference tables. Both tables refer to the stratum the node operates on.

In case of high congestion, nodes using more than one timeslot for transferring data for several streams should use one timeslot for real-time streams and stratified timeslots for non real-time streams. Nodes operating in mixed mode should transmit global timeslot occupancy and global interference tables during not stratified timeslots and stratum specific occupancy and interference tables during the stratified timeslots.

Reroute Stream

Supposing that in our network in FIG. 5, node H moves towards node E and away from F and K, it should decide at some time to change its uplink neighbor from node F to node E. The decision is finalized when node H transmits the Registration Request asking node E to perform the registration. The route of the data stream already transferring data from M to J is not affected by this decision. Node H has changed its uplink neighbor because the connection to node E is more reliable than the connection to node F. Node F receives the registration request too and removes node H and its leaves from the registration tables.

When node F removes node H from its registration tables, it should submit the Reroute Stream with the content "M requests new route to J for data stream from M". The message, that is initially transmitted by node F, travels towards node J according with the new structure of the registration tree, until it arrives at node J.

When the node registers with another access point, the Registration Request or Registration Update message travels to the new access point that registers the new node and all its downlink neighbors, if any. At the registration time, some of the downlink neighbors could be part of an active route. The Reroute Stream that follows the registration could be initiated by any node along the route. It tells the new access point to address the land network for changing the routing of messages. The new route is build from the new access point to the node soliciting rerouting. From there to the end node, which could be the source or destination of the stream, the old route remains unchanged.

As described in previous paragraph, repairing a route with Reroute Stream does not destroy the previous route, but creates a detour. Data packets already accumulated in nodes along the old route are forwarded and interleaved with data packets arriving on the new route. At destination node, data fragments are reordered according with data fragments serial numbers.

Sudden break of a route is solved by submitting the Registration Request and Reroute Stream in the same packet. In such case, some of the data accumulated in nodes along the old route may be lost. Depending on the class of service, the destination may transmit to source a Retransmit Request identifying the missing segments of data, or may drop the missing data fragments, expecting that the application will submit retransmission requests if it finds missing or incomplete data fragments.

Close Stream

The source of data may transmit the control message Close Stream in the same timeslot as the last packet of data. The message has as effect to release the buffers allocated to the stream by each node along the route, when they become empty.

The stream is also closed if no packet is received for a stream for some time. The length of time depends on implementation.

Routing Burst Data

Small amount of data could be transmitted between nodes without establishing a stream with the Burst Data message. The packet carrying data contains the identification of the source and the destination. The packet follows the same route as the Open Stream request. A node receiving a Burst Data packet will retransmitted it if at least one of the following conditions is verified:

the source is in registration tables, the destination is not in registration tables and the transmitter is a downlink neighbor, or
   the destination is in the registration tables, the source is not in registration tables and the transmitter is an uplink neighbor, or
   the source and destination are in registration tables on different branches.

The system and method of the present invention does not require exchanging a large number of messages for building and maintaining routes. The system and method preferably use the registration message for building the network structure (connections), reusing the same or similar message for maintaining the network structure, and a message preceding the transmission of data.

According with this method, data can start flowing from source to destination in the same time with the Open Stream message. It is different from known routing methods that require the source to transmit the Route Request first and then wait for the Route Reply before transmitting any data.

The Open Source message travels from the source node to the destination node for identifying the stream and for scheduling the communication timeslots. The only feedback provided to the node source is the Route Fail that is submitted by a node that does not have resources for providing services. Such situation could happen only when the network is in transitory situation and the current metric has not been fully propagated. Resubmission of Open Source should create a route that should not involve the node with no resources.

The registration is preferably the only information that is used for identifying the network structure and for routing the packets in the network. The selection of the uplink neighbor from all available neighbors is executed on criteria involving the availability of resources at neighbor and the distance of each neighbor to the access point (number of hops). When a node does not have enough resources, the downlink neighbors will look for another way to get connectivity to the access point. It leaves those nodes located in very active area as leaves of the connectivity tree. The method of the present invention requires that the registration process becomes one of the MAC (Media Access Control) functionalities. This concept is different from the view in the art that registration and authentication are very high-level processes.

The system and method of the present invention does not provide always the shortest routes when the source and destination nodes are registered with the same access point, but the frequency of such situations is extremely small. For the large majority of real cases, the method builds a route that is very close or identical to the shortest route.

Advantages associated with this method result in part from the fact that the network tree is built and maintained at maximum reliability before there is a need for building a route for transporting data.

Time Slot and Time Frame Structure

In another embodiment of the present invention, a method using time division for assigning time slots to network nodes is presented. After each node has selected the time slot it should operate in for transmitting data, it uses very little overhead for performing the transfer of data. It makes the value of $o_t$ to be very small, therefore allowing the operation of the network when the size of packets $p_s$ is very small.

For using a Time Division protocol, the time is divided in time frames (TF) and each TF is divided in time slots, as depicted in FIG. 4(a)). The Last Time Slot (LTS) in the timeframe is used for synchronizing the clock of new members with the network. For initial clock synchronization purposes, the protocol can be designed with the duration of LTS being the same as other time slots or longer. If LTS has the same size as any other time slots, then all packets transmitted during LTS must be shorter than usual. If LTS has a longer duration than usual, then packets transmitted during LTS can have the same size as the other packets.

During the communication process, each node takes the ownership of at least one time slot. Usually, the node uses the time slot for responding to neighbors requests for information and for signaling its presence in the network. Depending on the size of data packets, when a node is involved in at least one data stream, it may claim one timeslot for each stream of data or may use the same timeslot for transmitting data for multiple streams. A VoIP circuit has two streams running in opposite directions.

During the time slot, the node can transmit control data, payload data, or a mixture of both of them as one long structured message or as many successive short messages. In structured messages, the first part is for the control messages, while the second part is for traffic data. The border between these two sections is established dynamically, depending on the number of enclosed messages and the amount of traffic data.

FIG. 4(b) shows the structure of an example data packet transmitted during one time slot. In particular, the packet has three segments: Transmitter Identification, Control data and Payload. The Transmitter Identification is the identification of the node transmitting the packet. It could be the node MAC address or a shorter identification. For security purposes, the node can use a temporary identification that changes from time to time. The Control data is a sequence of Control Messages (FIG. 4(c)). In general, a Control Message has an identification code followed by parameters. The size and the number of parameters (FIG. 4(d)) of each control message are specific to each message. For example, a Registration Request message as discussed above, has three parameters: the identification of the node requested to register, the identification of the node to be registered and the identification of the node requesting the registration. A Hello message has the transmit power as the only parameter, while the Hello Reply has ten parameters. Control messages can be very short. Each message can have an identifier (code) and parameters (message data). In one transmitted message can be packed several control messages and traffic data for several streams. The Payload is a sequence of data for many Streams (FIG. 4(e)). Each stream is identified by its Stream number and fragment Sequence number (FIG. 4(f)). The Data count field defines the size of Stream data.

In ad-hoc multi-hopping networks, all packets are broadcast. For this reason, each node decodes every received data packet and identifies proper actions that it has to take according with the packet content. The acknowledgement of correct data reception is provided by the reception of the same packet or of a reference to the same packet that is retransmitted by the next neighbor in the route sequence.

Although all packets are broadcast, some control messages may be addressed to particular neighbors. Examples of such control messages are Registration Request and Heart Beat. The Access Point, which is the final destination of these two messages, confirms the correct reception by retransmitting the last received message to a nonexistent neighbor.

As discussed above, a similar confirmation procedure is used by the destination node of a data stream. It transmits a dummy data fragment with the same stream number and sequence number as the last correctly received data fragment, but with an empty content.

The transmission in the LTS uses a Carrier Sensing method. For this reason, the transmission in the last time slot is preferably delayed with a fixed amount of time required for listening to the frequency channel. If the frequency is occupied, the message is postponed until the next TF. The transmission in regular TS does not use CSMA, and then it is executed without delay.

Due to this mode of access to airwaves, each node listens to all neighbor transmissions and transmits only in its own TS.

The Concept of Cooperation

In a cellular network, the base station has full control of every node accessing the airwaves. Using the downlink frequency, the base station communicates to each handset the access plan to airwaves. The handset receives the information and transmits data to base station using the uplink frequency as scheduled by the base station. Ad-hoc multihopping networks, however, do not have base stations for coordinating the access to airwaves and there are no uplink or downlink frequencies. All nodes connected in one network transmit and receive information on the same radio frequency. As a result, each node exchanges data not with only one neighbor, but with all neighbors that are within the radio propagation range.

Nodes operating in ad-hoc multihopping mode could have the capability to operate in many frequency channels, but such capability allows the operation of multiple disjoined networks in the same geographical area, not the simultaneous access of the same node to many frequency bands.

The fact that no base station is available and that all members of an ad-hock network operate on the same frequency requires special collaboration between network nodes. In this collaboration, each node analyzes all information provided by neighbors and makes decisions that do not affect the quality of communication of any neighbor. The amount of information each node provides to the network should be enough for protecting its own operation against radio interference.

Nodes operating in ad-hoc multihopping networks should control the access to airwaves based on their own clocks. In order to participate in network, all nodes have to synchronize their clocks and cooperate with one another in order to prevent radio interference. Moreover, the information exchanged between nodes must reveal all hidden nodes.

The quality of clocks used in ad-hoc multihopping nodes is not very high. For this reason the nodes in network exchanges periodic message for maintaining the network synchronization.

Implementation of Collaboration

Collaboration is achieved through self-planning, exchange of information, and control of transmit energy. Each node selects one or many Time Slots and transmits only during the selected Time Slots. Between transmissions, the node listens to neighbors and collects information about the resource utilization and data traffic at neighbors.

Each node broadcasts information about its perception of utilization of resources by itself and neighbors. While listening to transmissions of neighbors, a node identifies "used" and "unused" Time Slots and then it broadcasts the collected information to neighbors, which in turn can identify those Time Slots that are contention free and could be used when needed. The information regarding the used and unused time slots, in this regard, can be provided as maps (one bit associated to each Time Slot), lists, or in any other manner.

If a node receives more than one message specifying the intent of using the same TS, it preferably broadcasts the interference information, even if no physical interference was identified yet. The submitters of the intent have to back off and use different Time Slots for transmitting the information.

If a node identifies that two neighbors are transmitting in the same timeslot causing interference, it transmits the interference information. (Such situation happens only as result of network mobility). Nodes transmitting during timeslots that are identified as affected by interference have to choose different Time Slots for transmitting information.

If a node needs more timeslots for transmission, it selects them from the list of available Time Slots, advertise the intention of using them and then use them if no conflict is identified by any neighbor. When Time Slots are not needed anymore, the node broadcasts the intent to free these timeslots and stops using them.

The control of transmit energy is important for reusing the Time Slots. The use of excessive energy drains node batteries and prevents the same time slot from being reused over a large area. Each node computes the transmit energy to be at a level that allows all neighbors to receive its messages. When the level of transmit energy is changed, the node broadcasts the information about the new energy level. When too many resources (timeslots) are used, a node should lower its transmit power to reduce the size of the neighborhood, freeing more timeslots. In this regard, collaboration is achieved through planning, exchange of information, and energy control. Based on information received from neighbors, each node can schedule its transmission, choosing unused timeslots. Exchanged information, in this regard, allows prevention of (1) causing interference to other terminals and (2) being affected by interference due to other terminals activity. Moreover, the power control assures reuse of timeslots and reduction of congestion. Additionally, network stratification allows a large number of nodes to share the same resources when the streams of data have low priority. More than one terminal transmits in the same timeslot, according with a plan decided by terminals sharing the resource The Clock In ad-hoc multihopping networks, the local clock of each node controls the beginning of the node transmission.

The node has a clock running continuously, a TS counter and a TF counter. The clock rollover adds one to TS counter, while TS rollover adds one to TF counter.

The node starts transmitting when the clock register shows zero and the TS counter has the value of the TS selected for transmission.

Access to Airwaves

In an ad-hoc multihopping network, almost all nodes are mobile changing continuously their positions one in relation with the others and with the Access Points. As discussed above, the Access Points are the only wireless devices that are required to remain in a fixed position, due to their wired interface. A mobile node can enter and can leave the geographical area where coverage is available at anytime and can continuously change its position in relation with the other mobile nodes.

The transmission during the LTS in a timeframe is preceded by Carrier Sensing. Transmission in LTS is postponed if a radio signal is detected. The transmission during any other TS is not preceded by Carrier Sensing.

Searching for a Network

The LTS is used by new nodes arriving to network for getting the initial access to the frequency channel and by nodes already operating in network that have lost the TS previously owned.

Figure 6:
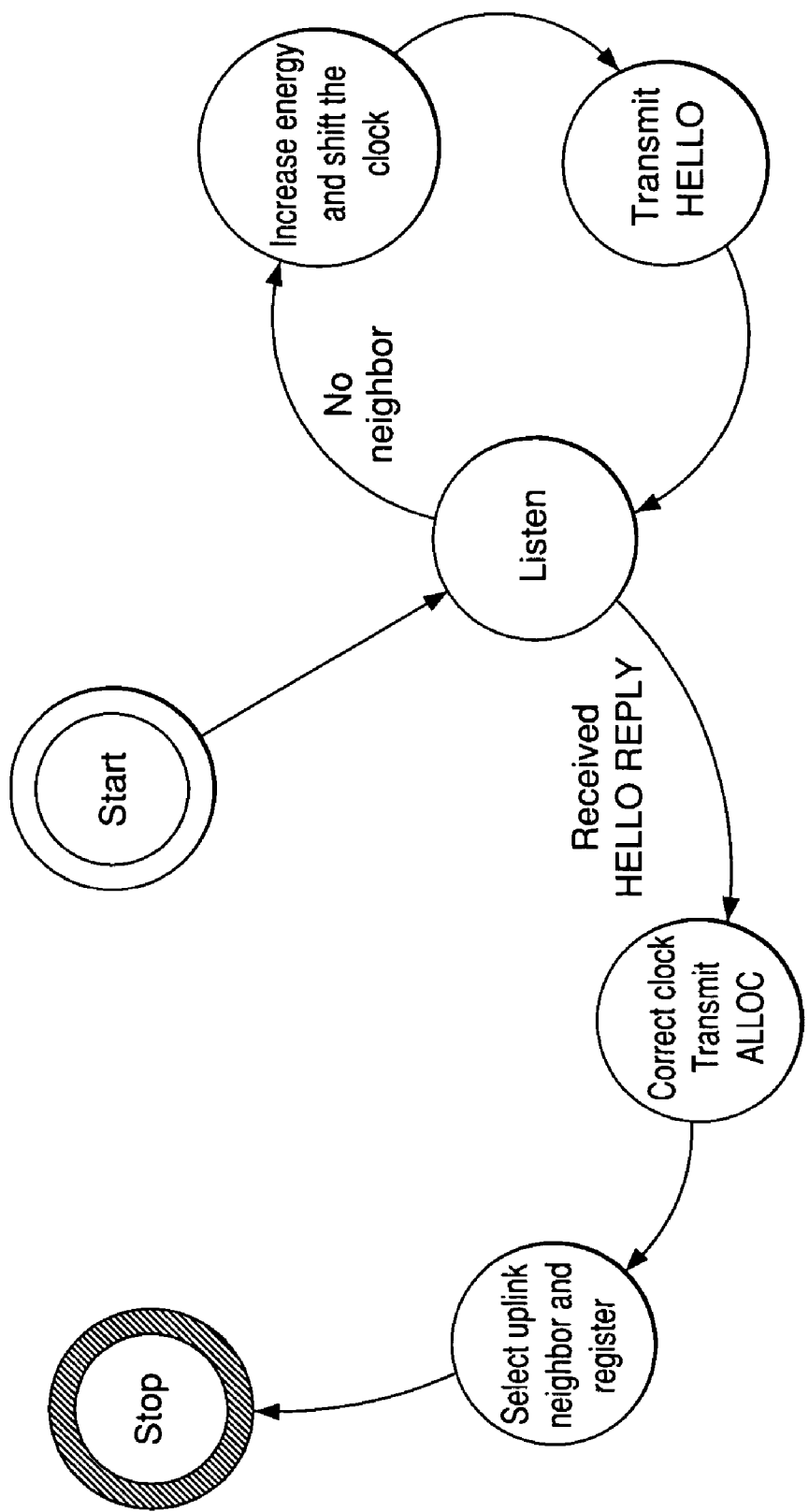
FIG. 6 is a diagram illustrating the state transitions of an example node as it searches for a network.

FIG. 6 shows the state transitions of a node searching for a network. When starting the search, the node sets its transmit power to minimum.

It listens for at least two timeframes to traffic in the neighborhood. If no signal is received, the node increases the transmit energy and transmits a HELLO message, wherein the node broadcasts the energy used for transmitting the message. The scope of the HELLO message is to let eventual neighbors know that a new device is in the neighborhood and it needs the information for connecting to the network. If no answer is received, the node increases the energy with one step, changes the value of the clock register, and transmits a new HELLO message.

All nodes receiving the HELLO message, must reply with HELLO REPLY messages containing:
1. the identification of the station transmitting the reply
2. the current time and the number of the current TF and TS
3. the description of Time Frame utilization
4. the Interference information
5. the level of the transmit power used for transmitting the HELLO REPLY message.
6. the metric of the transmitting node
7. the Access Point identification 8. the TOA of the received HELLO message When the node receives a HELLO REPLY, it corrects the clock register, the Time Frame counter and the Time Slot counter. Then it selects a free Time Slot and transmits the ALLOC_TS message during the LTS of the Time Frame.

The timeframe occupancy and interference information specify which time slots are busy and which are in use, according with the reception history of each neighbor and which TS are affected by interference.

In the last step, the node requests registration with the uplink neighbor transmitting a REGISTRATION REQUEST message.

Moving in the Network

Each node monitors the quality of received signals from its neighbors updating its own metric, according with the variation in time of the path loss to selected uplink and radio channel reliability. The path loss is computed from the Post Detection Signal Quality (PDSQ) or using any other method that eliminates from computation the level of environmental noise. If the difference between the metric computed corresponding to the uplink neighbor and the metric of any other neighbor becomes too large, the node should decide to change its uplink.

For changing the uplink, the node should transmit the REGISTRATION REQUEST message defining the new uplink neighbor.

Metric

The metric of a node k is computed from the metric of the uplink node $M'_k$, the path loss to uplink neighbor, the local congestion and the quality of the communication with the uplink neighbor.

$$M_k = M'_k + a + b*\text{PathLoss}_k + c*\text{Congestion} + d*\text{ChannelQuality}_k$$

Initially, the Channel Quality is set to zero. It is updated based on statistical data associated to signal received from the neighbor.

The a, b, c, and d are four empirical constants that are determined by experiments.

Registration Request

The registration process starts at one node and travels towards the Access Point as far as it is necessary. As discussed above, each node maintains registration tables that contain the identification of those neighbors that requested registration. Since the registration request travels in one direction only, this direction is used for classifying the neighbors as uplink neighbors (always only one) and as downlink neighbors (in any number).

The node requesting registration submits the REGISTRATION REQUEST message with the following parameters:
1. the identification of the node transmitting the request
2. the identification of the node to be registered
3. the identification of the node requested to perform the registration.

When a node receives a registration request, it checks its own registration tables. If an update is necessary, it makes the update and submits the registration to its uplink neighbor.

The REGISTRATION REQUEST message is transmitted with enough energy to be received by the uplink and the downlinks neighbors. The downlink neighbor that transmitted the REGISTRATION REQUEST receives the message and marks the fact that registration was accepted (at least by its uplink connection). The REGISTRATION REQUEST message, in this manner, travels up in the network until it does not create any change in registration tables.

When a new node connects to the network, the registration request travels up to the Access Point. When a node moves from one uplink to another, only the tables of the uplink nodes that are not on the same branch with the old uplink are affected.

The node moving from one uplink neighbor to another has to register all its dependents. A bulk registration message is used for registering more than one node at one time, as discussed above.

Deregistration

No special message is sent for deregistration of a node. When a node moves from one uplink to another, the old uplink receives the registration message addressed to the new uplink and removes the node and all its dependents from the registration tables.

Each entry in registration tables has a time stamp that is updated every time a registration request, a packet of data, or a Heart Beat message is received. Nodes not supporting traffic, in this regard, must periodically submit Heart Beat messages for preserving the registration information.

When a data packet passes through a node, the node updates the timestamp of all nodes recorded in the registration tables that are part of the route.

After a while, if not involved in any data transfer, the node switches to sleep mode, transmitting only the heartbeat message and listening to network activity from time to time. The switching to sleep mode is specified by a SLEEP message transmitted during the selected TS.

A terminal that has no data to transfer can sleep for few seconds at the time and wake up periodically for transmitting the Heart Beat message. Before transmitting, the terminal preferably listens for at least one timeframe to identify if its timeslot is still available. If another node is using the same timeslot, at the time when the Heart Beat message should be transmitted, the node allocates another timeslot by broadcasting the Allocation Request message during the LTS.

The node does not return to sleep if the node operator requests a transmission, if the node is solicited to support a data stream or if the node has to select another uplink neighbor. During the sleep period, the node listens to transmissions in some TF, but not to all of them.

When listening, the node monitors the TOA of messages from neighbors. These TOA should be smaller than 3 microseconds, as reception farther than 1 Km is not possible. An incorrect value of TOF can be caused only by unsynchronized clocks. In such case, the node should require clock synchronization.

Transmit Energy

In an ad-hoc multihopping network using Time Division Access, each node must be able to communicate with all neighbors within the propagation range. In order to assure that all messages are received by all neighbors from which messages are received, the transmit energy is computed based on the maximum path loss of all neighbors.

The POWER message is transmitted every time the node changes the level of the transmit energy. Once changed, the power level remains constant for some time. When a need for energy level change is identified, the new energy level is computed using the predicted value of the path loss for several seconds ahead.

Due to continuous movement of nodes in ad-hoc multihopping networks, the transmit energy has the tendency to increase continuously. When two nodes move apart one from another, they have to increase the transmit energy for remaining in contact. The signal travels farther, which forces other nodes to increase the energy level too for responding to received messages. The situation in the neighborhood does not change when the two nodes finally break the link between them and connect to closer neighbors.

For bringing the network transmit energy to realistic values, a simultaneous action is executed in the whole network. At the beginning of Time Frame Zero, for example, the path loss of all neighbors not directly connected through a path, is set to zero. As a result, the transmit power for Time Frame Zero is computed only for maintaining the direct connections and the maintenance thereof. This action brings down the power in the whole network to levels required by direct connections. During subsequent Time Frames, the transmit energy could be increased if it is necessary. This action does not affect the efficiency of data transfer that is always performed with directly connected neighbors only.

Figure 7:
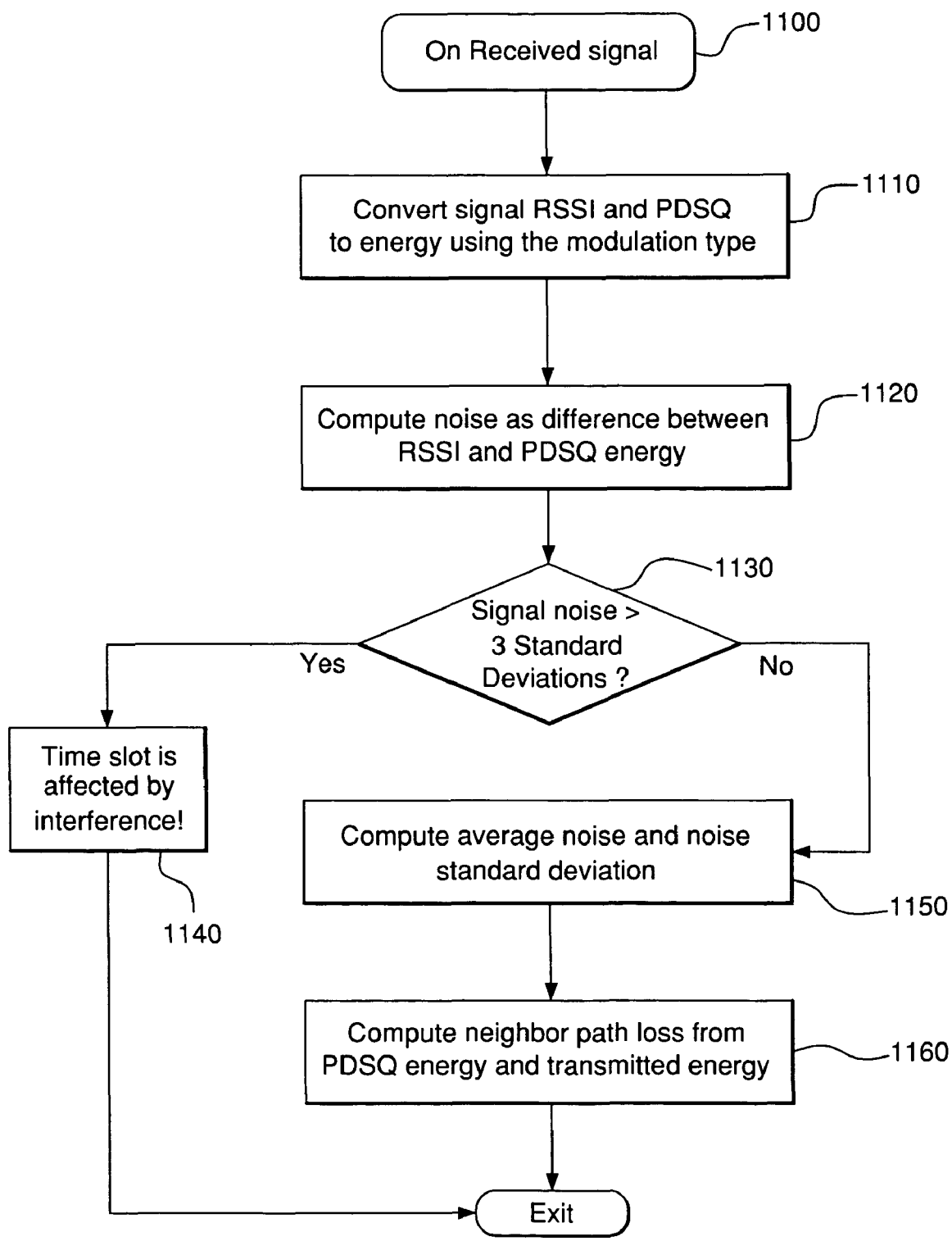
FIG. 7 is a flow chart showing an example of operations performed by a node in the network shown in FIG. 5 in response to receiving a signal from a neighboring node for identifying the loss of signal energy along the transmission path.

FIG. 7 presents a chart illustrating actions that are executed when the signal from a neighbor is received in Step 1100. The strength of the signal is characterized by the Received Signal Strength Indicator (RSSI) and Post Detection Signal Quality indicator (PDSQ). These two measurements are converted to energy according with equipment characteristics and with the modulation of the received signal in Step 1110. The "environmental noise" is calculated, as the difference between the energy carried by RSSI and PDSQ in Step 1120.

If the signal noise is higher than the level of environment noise with at least two standard deviations in Step 1130, the received signal could be affected by interference with a probability larger than 92%. The fact is broadcast as "time Slot affected by interference" when the node makes the next transmission in Step 1140.

If the signal is not affected by strong interference, the average and the standard deviation of noise at reception point are computed in Step 1150.

Then, the path loss to the neighbor is computed in Step 1160 from where the signal is received, as the difference between the energy communicated by neighbor in last POWER message and the energy measured from PDSQ.

The average level of noise at receiving site is communicated to neighborhood when the next POWER message is transmitted.

Figure 8:
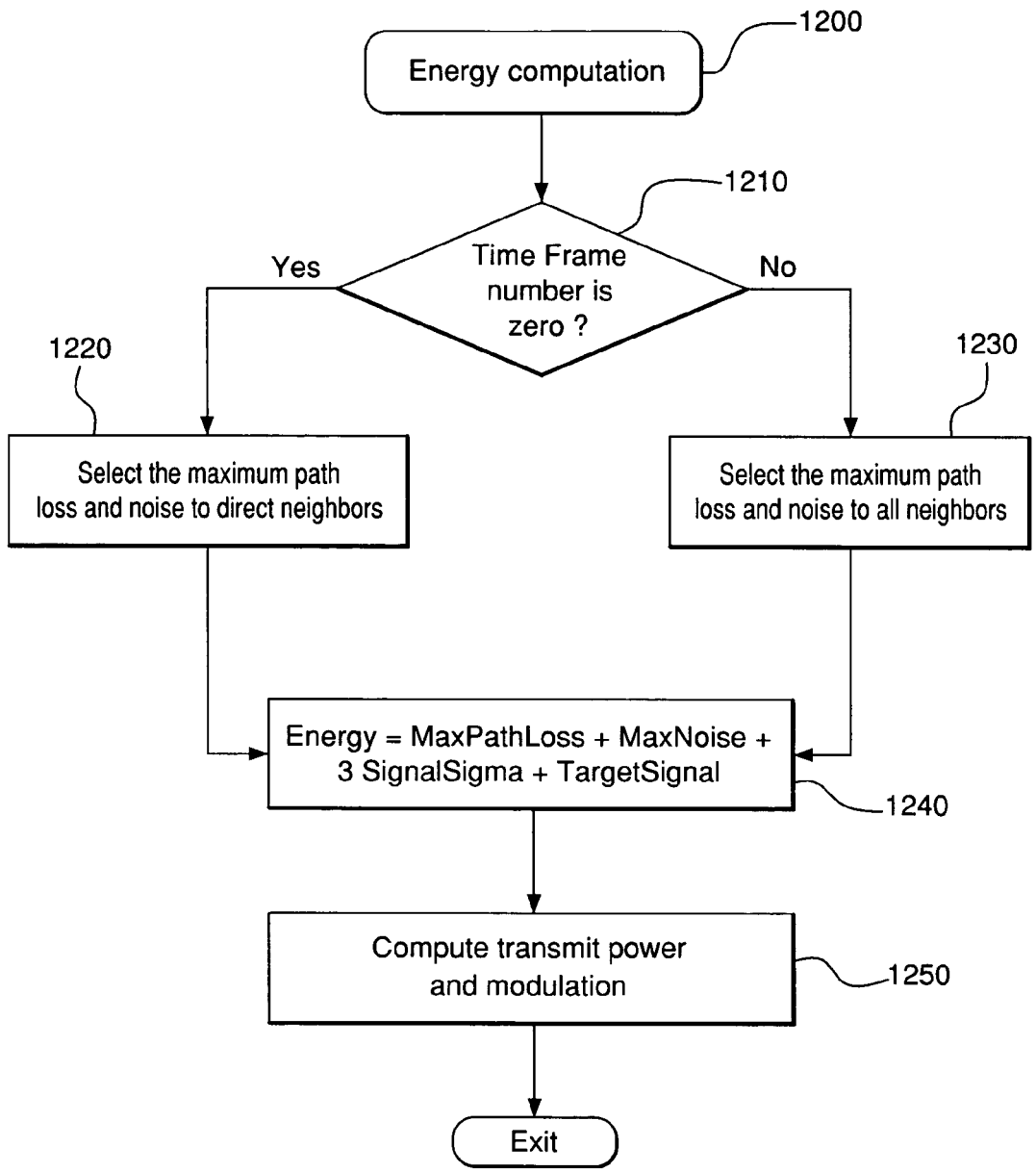
FIG. 8 is a flowchart showing an example of operations by a node in the network shown in FIG. 5 in computing the minimum transmit energy.

FIG. 8 shows the computation of the transmit energy at Step 1200. The transmit energy is computed differently for Time Frame zero, than it is computed for other Time Frames.

If the Time Frame is zero in Step 1210, then only those neighbors that are in direct contact (on stream routes) are considered when selecting the maximum path loss in Step 1220; for all other Time Frames, all neighbors are considered in Step 1230.

The transmit energy is computed in Step 1240 from the maxim value of the path loss to all considered neighbors, the noise level reported by the neighbor with the largest path loss, three times the neighbor signal standard deviation, and the desired level of the signal at neighbor. Depending on the level of the transmit energy and the transceiver capabilities, the appropriate transmit power and the proper modulation technique are selected in Step 1250.

The search for the proper modulation and transmitting power starts with the modulation providing the highest throughput, which also uses the smallest transmitted energy per bit. The transmitting power for this modulation is computed in concordance with the requirements of transmitting energy. If the transmitting power is larger than the value the transmitter can provide, a modulation with higher energy per bit is tried. The modulation with highest throughput that requires lower transmitting power than the transceiver highest transmitting power, is the best choice for providing the communication.

Acknowledgement of Data Reception

No explicit acknowledgement of reception is required when the network operates in full cooperation. After a node transmits a data packet to the next node along a route, it listens to the correspondent transmissions for the next hop. Packets that have been retransmitted by any correspondent are considered as successfully received. The destination of the data preferably transmits empty messages for confirming the correct reception as discussed above.

Figure 9:
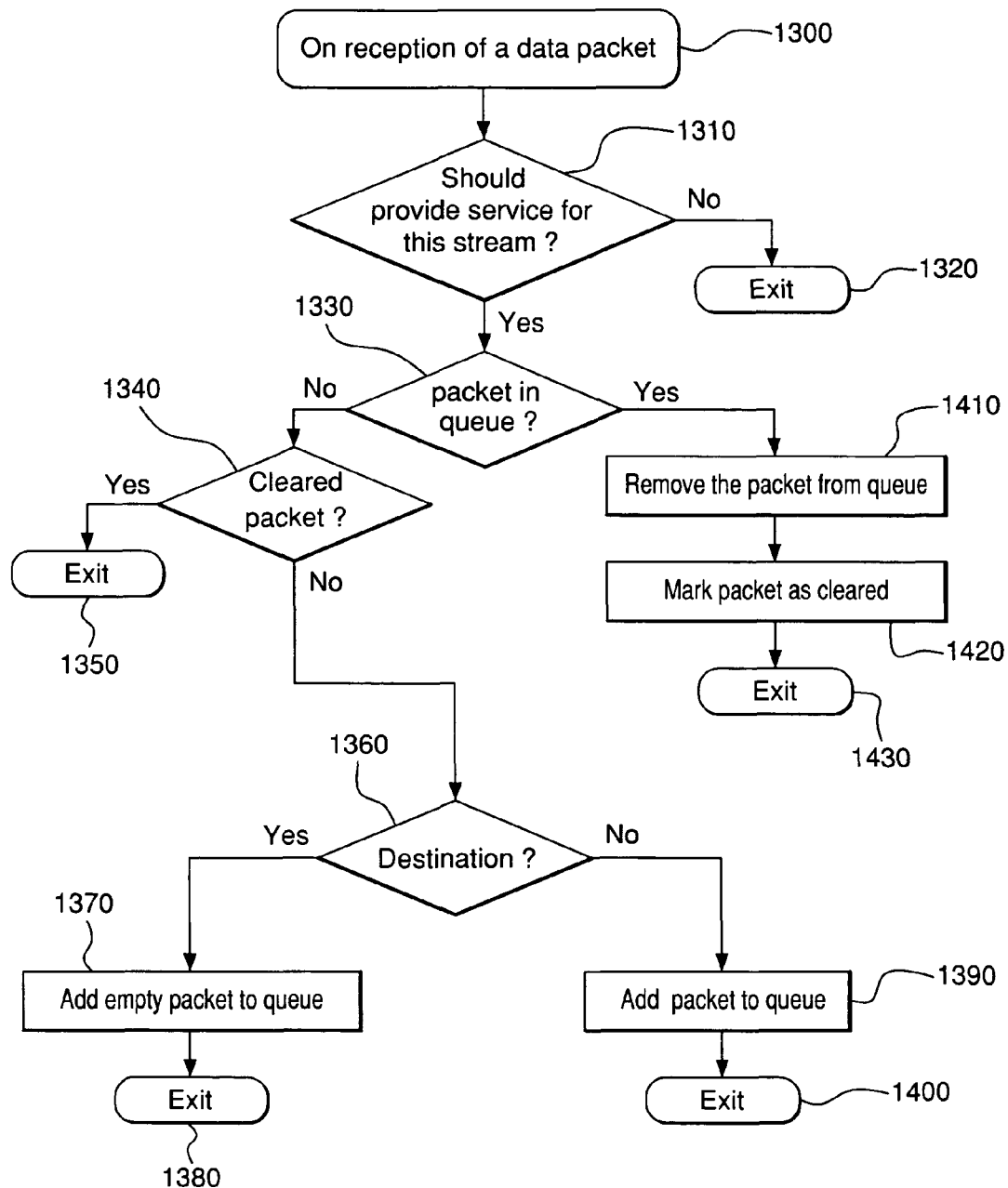
FIG. 9 is a flowchart showing an example of operations performed by a node in the network shown in FIG. 5 for identifying actions to be performed in response to a received packet.

FIG. 9 shows an example of the procedure used for identifying proper reception of transmitted packets. The procedure 1300 is executed every time a packet is received. First, it is checked in Step 1310 if the received packet contains data fragments for a stream that the receiving node should provide service to. If not, the procedure is complete at Step 1320. If yes, then the packet is checked if it is already in the queue of transmitted packets that should be retransmitted in Step 1330. If it is there, the packet is removed from queue and is marked as "cleared" in Step 1420, wherein the procedure is complete in Step 1430. If the packet is not in the transmission queue, it is checked if it was already cleared in Step 1340. If the packet was previously cleared, it has been received from a downstream node and is ignored in step 1350. If it is a new data packet, it is determined whether the receiving node is the destination node for the data packet in Step 1360. If not, the packet is added to the transmission queue in Step 1390. If so, the current node is the destination of the packet, then an empty packet (the confirmation of reception) is added to the transmission queue in Step 1370.

It may be possible that one node receives packets for the same stream from two different neighbors. It happens, for example, when one intermediate node moves away and the route is repaired. For maintaining all packets in the correct order, each data packet preferably has a serial number. The serial number of packets is used for identifying cleared packets and setting the priorities when transmitting packets from a stream queue.

Connected and Disconnected Networks

An ad-hoc multihopping network can be connected to an Access Point or not. If it is not connected to an access point, the network is called "disconnected" and the only available communications are within the network (also called peer-to-peer).

A new node can identify if the network is connected or not from the HELLO REPLY messages that contain the identification of the Access Point.

When a node has the choice to register either with a connected or with a disconnected network, it preferably chooses registering with the connected network, regardless of the value of the metric.

Data Fragmentation

In another embodiment of the present invention, a method for efficient utilization of channel bandwidth by a node is presented. This method does not bind to any type of network protocol; rather, it makes the ad-hoc multihopping networks able of supporting any existing and future protocols implemented on wired networks such as, for example, VoIP, IPvx, ISDN and ATM.

The scope of ad-hoc multihopping networks is to transport data from source to destination. As discussed above, the route from source to destination is identified by a stream number. If several applications running on the same source and on the same destination require data transfer, a different stream is associated with each pair of applications that exchange information. This is the case, for example, when the operator of a PDA browses the internet while having a phone conversation or receives data from more than one Internet site in the same time.

As discussed above, when opening a route, the source node identifies the nature of the stream. Data for voice applications, in this regard, are needed in real-time as a sound decoder cannot operate without data. Applications based on file transfer are designed to be insensitive to pipeline delays and jitters. Moreover, video data could be affected by large delays, but the variation of time interval between arrivals of packets must be very constant. For these reasons, an application requesting a connection stream has to define the priority of the data transfer.

When a stream is created, all nodes along the route create stream queues, where the received data packets are stored. Moreover, the source node and the destination node create the appropriate buffers between logical link control (LLC) and media access control (MAC).

At the source node, an application provides data to LLC according to the protocol used by application. LLC identifies the stream number by searching the packet header, splits data in fragments and stores these fragments in the stream buffer. MAC removes data segments from the stream buffer and transmits them during the selected time slots. High priority data are removed from the buffer as soon as possible, and transmitted in next TS. Low priority data are transmitted only after emptying the buffers of high priority data. MAC associates to each transmitted packet a sequence (serial) number (from 0 to 31, for example). The source listens to the retransmission of its packets by the next hop. Those packets missing from the retransmitted sequence are transmitted again.

Intermediate points add received packets to the stream queue. These packets are then removed from the queue and transmitted based on sequence number. Each intermediate node listens to the transmissions of the next hop in order to identify the correct reception of data. Data packets missing from sequence are retransmitted.

At the destination node, MAC provides LLC with a queue of data fragments associated to the stream. Each received fragment is added to the LLC buffer according with fragment sequence number. Depending on the stream priority, missing or late packets may be dropped. LLC restores data to its initial format and presents it to the application.

This operational mode makes wireless network transparent to applications and protocols.

Flow Equalization

Each node along a route has one data queue associated to each stream. When the node receives a data packet, it is added to the stream queue. During the selected TS, the node transmits received packets based on stream priority and packet sequence number. Transmitted packets are removed from queue only after receiving the confirmation from the next hop. For voice data transfer, packets that are too old compared with just received packets are dropped from queue and not transmitted.

In some conditions, a node may accumulate a large number of packets waiting to be transmitted or retransmitted. If the number of waiting packets is too large, the node can use extra TSs for transmitting more packets. In one transmission, the node includes the message Allocate TS mentioning the identification number of the claimed TS. For selecting an extra TS, the node looks to the interference and occupancy tables and selects an unused TS. Preferably, the first TS available with a number larger than the current TS, is selected. During the current TF, the same TS should not be claimed by any other neighbor transmitting at smaller TS numbers.

After the message for claiming the new TS is transmitted, the node can transmit extra data in the newly selected TS. Within the packet transmitted in the new TS, the node can add another Allocate TS if more bandwidth is needed.

Depending on the level of congestion in the node neighborhood, the node may allocate and keep active several TS in the same time or it can use rolling allocation. Time Slots held active for a longer time must be released when the node has exhausted data in excess.

Rolling allocation assures fair repartition of resources when the frequency channel in the neighborhood is congested but it is prone to interference. With this method, during the transmission of one packet, a node allocates one extra TS, then it transmits data and releases the currently used timeslot. When using this procedure, a node should keep one permanently allocated TS that is protected from interference.

Table 3, below, shows a simple example scenario of rolling dynamic allocation for a system running with 8 TS per TF. The table illustrates a scenario in which five nodes are involved in data transfer services for the same data stream. The route could be much longer, but only these five nodes are considered in this scenario. The stream flows X→A→B→C→Y and the five nodes transmit according to the following basic schedule: X in TS 5, A in TS 0, B in TS 1, C in TS 2 and Y in TS 6. It is assumed in this scenario that each node can communicate only with its closest two neighbors. Nodes X and Y are not presented in this table. The line "Utilization" at the top of Table 3 shows the view of the TS allocation at each node. The stations from which data is received directly are indicated by their names, while an asterisk is used for marking these TS used by hidden stations. The column in the left is the time slot number. For each time slot, the table has two lines. The first line shows how many buffers are filled at each station before the operation on the current time slot is executed. The second line shows, under "Utilization", which node transmits a message and which timeslot it claims (plus sign) or releases (minus sign) in the transmitted message. The rest of the second line has three columns for stations A, B and C. At each station is shown the information that the node has about the utilization of the timeslots by itself and other nodes. Each box contains the name of the terminal "owning" the time slot. It is a letter if signals have been received from that terminal, or an asterisk, if the owner of the timeslot is hidden. The information about hidden nodes is retrieved from the occupancy reports transmitted periodically by each terminal. For example, in column A is mentioned that TS 0 is owned by A (A transmits in TS 0), TS 1 is owned by B (A has received signal from B in TS 1), TS 5 is owned by X (A has received signals from X in TS 5) and TS 2 is used by some hidden node. It is an information retrieved from a report in which B said that it knows that TS 0, TS 1 and TS 2 are in use (B had received signals from A in TS 0, uses itself TS 1 and has received signals from C in TS 2). At the beginning of the simulation, node A had 5 packets in its buffers, B had 3 packets and C had 2 packets.

Each node listens to neighborhood transmissions, than communicates to neighbors in which time slots the reception was possible. In this manner, for example, node A receives signals in TS 1 from B and in TS 5 from X. It communicate to neighbors that timeslots 1, 5 and 0 are busy on its site.

The message regarding the utilization of time slots transmitted by node B contains the numbers of these time slots when B receives radio signals. These numbers are zero (signal from A) and two (signal from C).

While listening to B, A receives the list of TS during which B receives signals. They are TS 0 (signals from A) and TS 2 (signals from C). When A receives the list from B, it identifies that B receives signals in TS 2 from a station that is not a neighbor of A, therefore, it is a station hidden to A.

own table) and releases currently used TS 3 (marked in chart by A +6 –3). The only node receiving the request is B, which

TABLE 3

| TS | A TS = 0 | | | | | | | | B TS = 1 | | | | | | | | C TS = 2 | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Utilization | A | B | * | | | X | | | A | B | C | | | * | * | | * | B | C | | | | | Y |
| 0 Buffers | | | | 5 | | | | | | | | 3 | | | | | | | | 2 | | | | |
| A +3 | A | B | * | A | | X | | | A | B | C | A | | * | * | | * | B | C | | | | | Y |
| 1 Buffer | | | | 4 | | | | | | | | 4 | | | | | | | | 2 | | | | |
| B +4 | A | B | * | A | B | X | | | A | B | C | A | B | * | * | | * | B | C | * | B | | | Y |
| 2 Buffers | | | | 4 | | | | | | | | 3 | | | | | | | | 3 | | | | |
| C +5 | A | B | * | A | B | X | | | A | B | C | A | B | *C | * | | * | B | C | * | B | C | | Y |
| 3 Buffers | | | | 4 | | | | | | | | 3 | | | | | | | | 2 | | | | |
| A +6 –3 | A | B | * | | B | X | A | | A | B | C | | B | *C | *A | | * | B | C | * | B | C | | Y |
| 4 Buffers | | | | 3 | | | | | | | | 4 | | | | | | | | 2 | | | | |
| B +7 –4 | A | B | * | | | X | A | B | A | B | C | | | *C | *A | B | * | B | C | | | C | Y | B |
| 5 Buffers | | | | 3 | | | | | | | | 3 | | | | | | | | 3 | | | | |
| A rx C –5 +3 | A | B | * | | | X | A | B | A | B | C | C | | * | *A | B | * | B | C | C | | | Y | B |
| 6 Buffers | | | | 4 | | | | | | | | 3 | | | | | | | | 2 | | | | |
| A –6 +3 | A | B | * | A | | X | | B | A | B | C | AC | | * | * | B | * | B | C | C | | | Y | B |
| 7 Buffers | | | | 3 | | | | | | | | 4 | | | | | | | | 2 | | | | |
| B –7 +4 | A | B | * | int | B | X | | | A | B | C | int | B | * | * | | * | B | C | int | B | | | Y |

From Table 3, it is apparent that node A can use in step 0 TS 3, 4, 6, or 7 if it needs more bandwidth for transmitting data, as those time slots are not used by any neighbor or neighbor of neighbors. In similar mode, B can use TS 3, 4 or 7, while C can use 3, 4, 5 and 7.

In this regard, the example scenario depicted in Table 3 illustrates the evolution of the number of packets in buffers and the utilization information as seen by each of the three nodes.

In this scenario, for example, node A had 5 packets in its buffer at Time Slot zero while node B had 3 packets and node C had only two packets.

At Time Slot zero, node A transmits one packet that is received by node B. Because A has too many data packets in its buffer, it makes a request for allocation of TS 3 (marked in chart as A +3) as an extra TS. The request is received by node B only, which updates the information regarding the occupancy of time slots adding A at TS 3. At the end of TS 0, only A and B knows that A requested allocation of TS 3.

In next time slot (TS=1) the number of packets in node buffers was changed. Due to previous transmission of A, A has now 4 packets, B has 4 packets and C has two packets. Node B is scheduled to transmit during this time slot. It transmits data to C and makes the request for allocation of TS 4 (marked as B+4) that it knows it is not used. The request is received by both A and C which update their occupancy tables. Because occupancy tables of B were changed since last transmission, B transmits the occupancy information, which informs C that TS 3 is being used by one of its direct neighbors.

In the next time slot (TS=2), the number of packets in node buffers is changed again, as B has transferred one packet to C. During the TS, node C transmits one packet to Y and requests the allocation of TS 5 (marked in chart a C+5). Node C decides on TS 5 because it is the first TS available. The request to allocate TS 5 is received by B, which identifies that C will transmit in the same TS as a neighbor of A. Since B is not affected by this operation, it takes no action.

In TS=3, node A can transmit again. Since it requested the allocation of TS 3 and no complain has been received until now, it can proceed with the transmission. It transmits a packet to B, requests allocation of TS 6 (first available TS in marks the change in its tables. Node B identifies that the transmission from A will be in the same TS with the transmission of a neighbor of C, but it does not affect the correct reception and it takes no action.

In TS=4 node B transmits data, releases TS 4, requests allocation of TS 7 and transmits the updated utilization table. Both A and C receive the request and update the occupancy information.

In TS=5, A receives a packet from X (marked in table with A rx) while C is transmitting a packet to Y, releases TS 5 and requests TS 3. These requests are received only by node B, which updates its tables.

In TS=6, A transmits a packet to B, releases TS 6 and requests TS 3. The request is received by B, which identifies that A and C have both scheduled transmissions during the same TS 3. When its turn comes, B preferably transmits the Interference information that prevents A and C from simultaneously using in the same time slot.

In TS=7, B releases TS 7, assigns TS 4, transfers a data packet to C, and broadcasts the interference information regarding Time Slot 3. Because the request for allocation of A and C was not successful, both nodes A and C should select the extra TS at random from all available TSs.

Unique Packet (Data Burst)

Usually, large amount of data are transmitted between nodes over a long period. Phone conversation can take minutes, while reception of video or audio streams could take even longer time. Routes and streams are built for supporting such data transfer. In particular, large files are split in small segments which are transmitted to destination as many packets. Although all those cases are the most frequent encountered in real operations, sometimes relatively short amount of data must be transmitted between any two nodes in the wireless or wired network. If such data could be included in a small number of packets, building a route and creating a stream could require exchanging more information that the carried data.

A small amount of data can be packed as a ConfigData message. It is a Control Message that has as parameters: the source of message, the destination of the message, the segment sequence number, the length of the data and the payload. If the currently allocated TS is used at full capacity, the ConfigData can be transmitted during the next TS. The Allocate TS request could be included with the regular transmitted packet, while Release TS is included with the ConfigData if data is packed in more than one segment.

Each node receiving the ConfigData message looks in its registration tables for the destination node. It retransmits the message only if the message was transmitted by a downlink neighbor and the destination is not in the registration list, both the destination and the source are in registration tables but on different branches or if the message was transmitted by any uplink neighbor and the destination only (not the source) is in registration tables.

If a confirmation of reception is required, the destination of the ConfigData should transmit a ConfigDataAck with the identification of source, destination and segment number. The acknowledgement travels in network in opposite direction as ConfigData does.

High Speed Data Traffic

Proper planning of the TS may have as effect to minimize the pipeline delays, fact that is important when transferring voice data.

Figure 10:
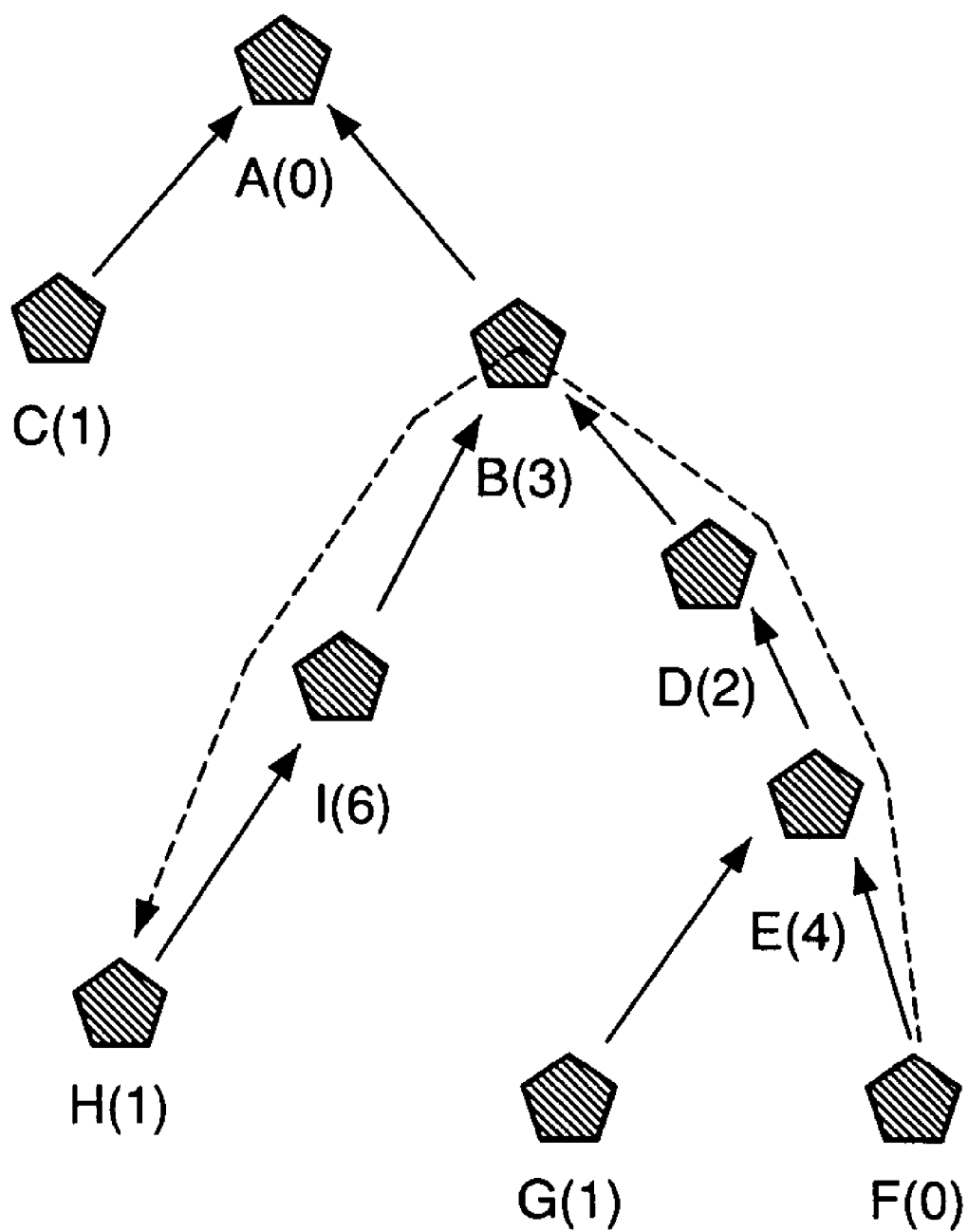
FIG. 10 is a diagram of an example network comprising access point A and nodes B-I and the communication path followed by data packets transmitted by node F for node H.

The chart in FIG. 10 shows a network that requires communication from node F to node H. It is supposed that in this network with 8 time slots per TF, each node can exchange data only with its direct neighbors. Numbers in parenthesis show the time slot during which each node transmits data.

Figure 11:
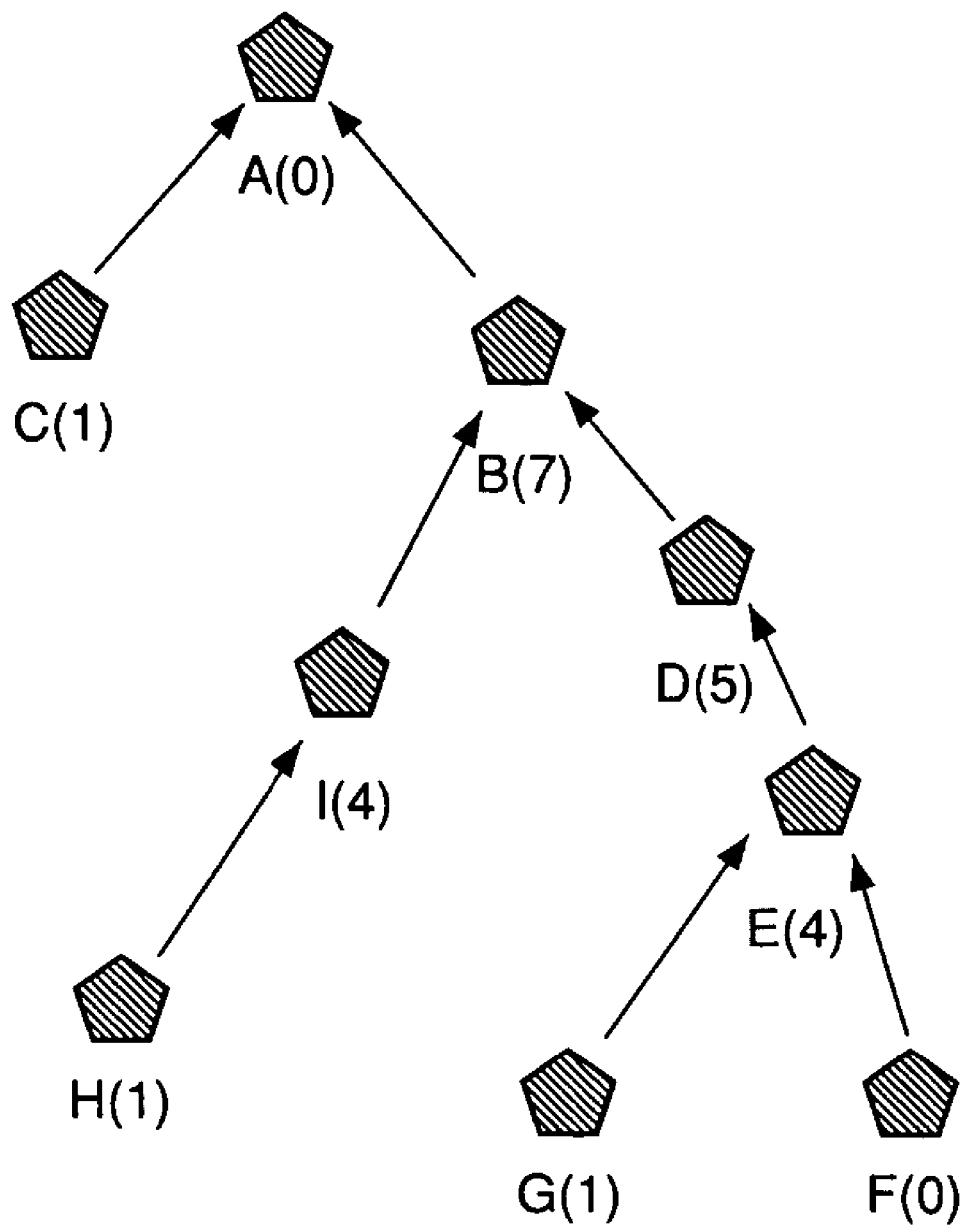
FIG. 11 is a diagram of the example network shown in FIG. 10, wherein the pipeline delay along the route from node F to node H has been reduced by changing the assignment of transmission slots.

In the initial case, the total pipeline delay is 14 TS. Based on information from neighbors, nodes D, B and I can change the TS as shown in FIG. 11. As result, the pipeline delay is down to 12.

Figure 12:
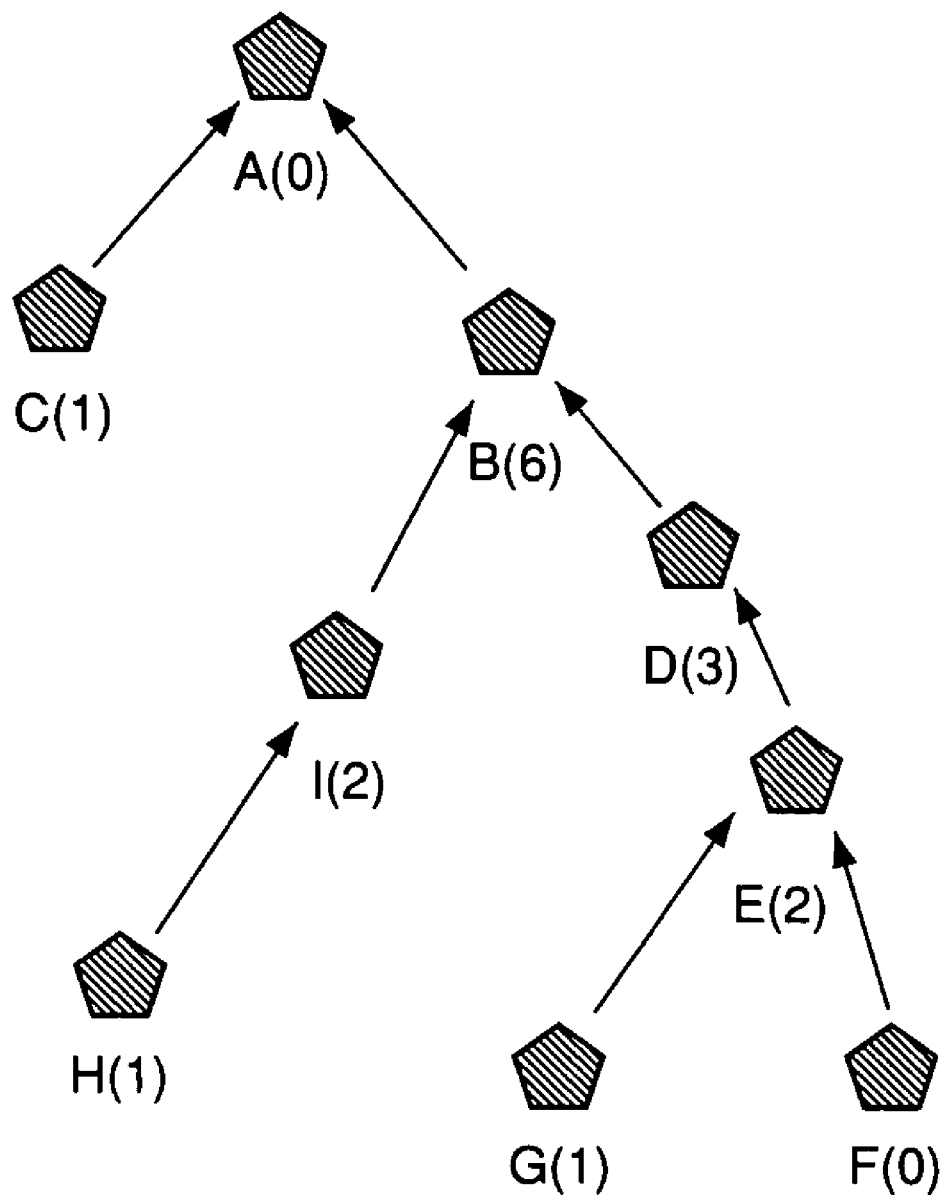
FIG. 12 is a diagram of the example network shown in FIG. 11, wherein the pipeline delay along the route from node F to node H is further reduced.

The new allocation of TSs allows each intermediate node to choose the TS closer to the TS of previous node on the path. As result, the allocation presented in FIG. 12 has a pipeline delay of 10 TS.

Figure 13:
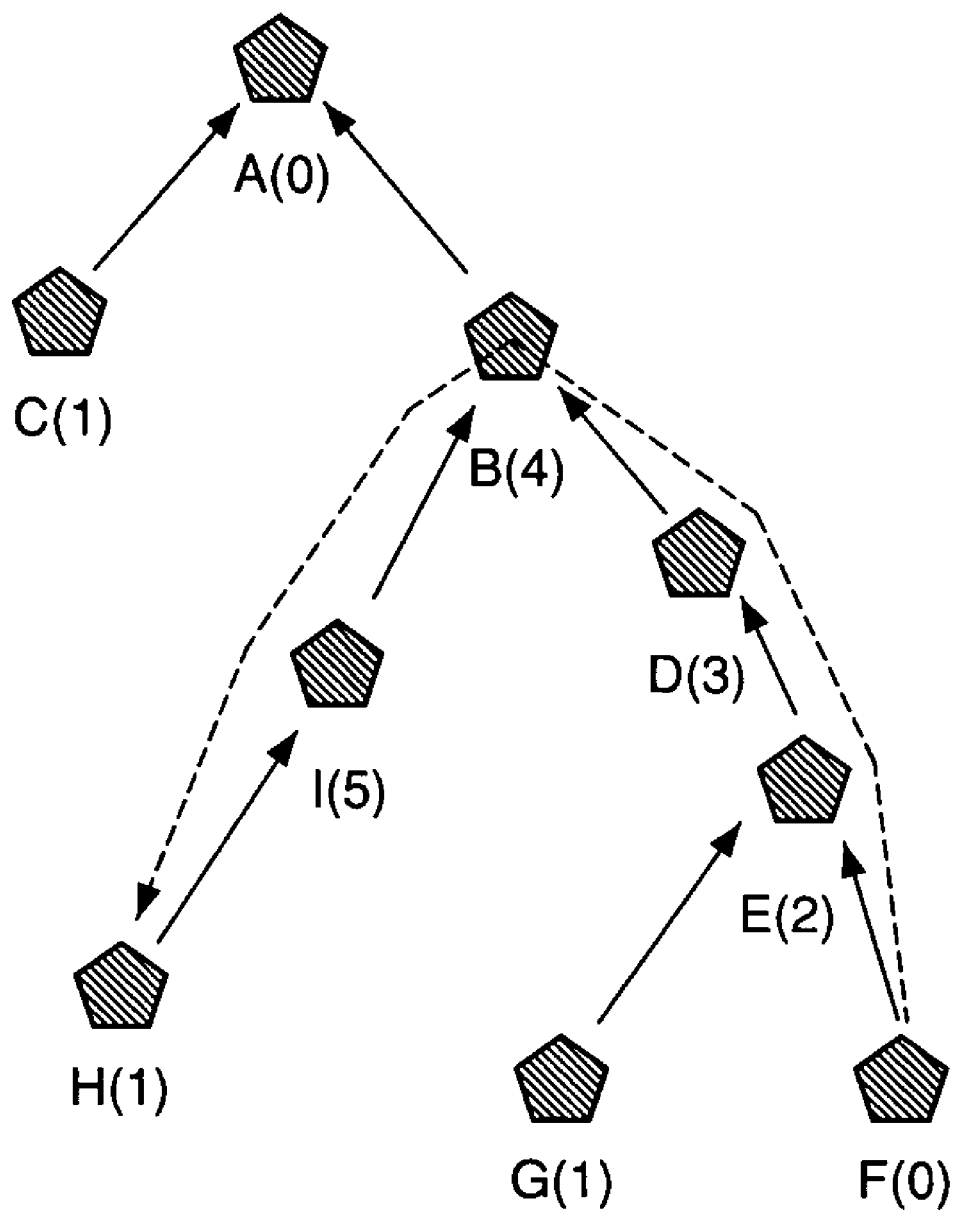
FIG. 13 is a diagram of the example network shown in FIG. 12, wherein the pipeline delay along the route between node F and node H has been reduced to a minimum.

Finally, FIG. 13 shows the optimal TS allocation. In this case, the pipeline delay is down to 5 TS.

During the process of TS reallocation, the decision was made based on data collected from neighbors during the current and previous Time Frames.

For the reduction of end-to-end delay to be effective, the optimization must be performed during the call setup, before the data stream starts flowing.

Efficient TS Allocation

Time Slots are the most important resource in a Time Division scheme applied to multihopping ad-hoc networks. In such environment, a Time Slot can be reused as close as over two hops. For achieving high utilization of Time Slots, a simple procedure should be implemented, for those nodes not involved in transporting data along a route.

The procedure requires that each node not involved in transporting data along a route, transmitting control (Heart Beat) information during the Time Slots with the smallest possible number.

Such scope cannot be easily achieved in any conditions without precautions. In dense network, for example, two or many nodes may attempt to allocate the same Time Slot simultaneously. For preventing such an occurrence, the moment (the Time Frame) when a node selects a new Time Slot as well as the number of the selected Time Slot must be controlled with random processes. The Time Frame when the node chooses to execute a reallocation to a time slot with a smaller number is controlled by a procedure generating randomly Success or Failure indicators. The rate of Failure to Success should be equal with the number of neighbors. The node that identifies that it needs reallocation of the timeslot, proceeds only if the indicator is Success. Also, the number of the Time Slot that the node chooses for transmitting control data, is selected at random from the set of available Time Slots that have a smaller number than the currently allocated Time Slot.

A node stops attempting to optimize the allocation of Time Slots when it does not have available any Time Slot with smaller number than the currently used Time Slot.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for managing channel access by nodes in a wireless communication network, the method comprising:
   monitoring, by at least one node in the network, at least one of data transmissions and intent-to-transmit messages by neighboring nodes;
   determining, by the at least one node, the identity of those time slots in use by the at least one node and by the neighboring nodes and those time slots not in use by the at least one node and the neighboring nodes;
   broadcasting, by the at least one node, information including the identity of used and unused time slots to the other nodes, such that the other nodes can chose an unused time slot for packet transmission;
   operating the at least one node to compute the transmit energy used to transmit data packets, based on the predicted path loss of monitored nodes directly connected to the at least one node; and
   broadcasting the computed transmit energy from the at least one node when the at least one node changes the level of transmit energy.

2. The method of claim 1, further comprising:
   operating the at least one node to broadcast an interference message when the at least one node monitors intent-to-use messages for the same time slot from two or more different neighboring nodes.

3. The method of claim 1, further comprising:
   operating the at least one node to broadcast an interference message when the at least one node determines that at least two different neighboring nodes are using the same time slot for packet transmission.

4. The method of claim 3, further comprising:
   operating one of the at least two different neighboring nodes to choose a different time slot in response to the interference message.

5. The method of claim 1, wherein the communication network includes a wireless ad-hoc peer-to-peer and multi-hopping communication network in which the nodes operate.

6. The method of claim 1, wherein each node in the wireless communicative network is in at least one of uplink and downlink association with at least one neighboring node.

7. The method of claim 6, wherein each node comprises a registration table identifying at least downlink nodes that are associated with the node.

8. A method for efficient utilization of channel bandwidth by nodes in a wireless communication network, the method comprising:
   recording in a utilization table of a node the identity of time slots allocated by the node for data packet transmission, the identity of time slots used by neighboring nodes for packet transmission, and the identity of time slots at which the neighboring nodes receive packet transmissions;

broadcasting the utilization table from the node to neighboring nodes, wherein the neighboring nodes receiving the broadcast update their own utilization tables in view of the received utilization table, and wherein the utilization table at each node is usable by that node for selecting unused time slots for transmitting data packets;

computing the transmit energy of the node used to transmit data packets, based on the predicted path loss of neighboring nodes; and broadcasting the computed transmit energy from the node when the node changes the level of transmit energy.

9. The method of claim 8, wherein the network communication network includes a wireless ad-hoc peer-to-peer and multi-hopping communication network in which the nodes operate.

10. The method of claim 8, further comprising:

operating the node to broadcast an interference message to neighboring nodes when the node monitors intent-to-use messages for the same time slot from two or more different other nodes.

11. The method of claim 8, further comprising:

operating the node to broadcast an interference message to neighboring nodes when the node determines that at least two different neighboring nodes are using the same time slot for packet transmissions.

12. The method of claim 11, further comprising:

operating one of the at least two different neighboring nodes to choose a different time slot for packet transmission.

* * * * *

UNITED STATES PATENT AND TRADEMARK OFFICE
CERTIFICATE OF CORRECTION

PATENT NO. : 7,773,569 B2  
APPLICATION NO. : 11/132907  
DATED : August 10, 2010  
INVENTOR(S) : Belcea It is certified that error appears in the above-identified patent and that said Letters Patent is hereby corrected as shown below:

IN THE SPECIFICATION

1. In Column 6, Line 57, delete "Over" and insert -- over --, therefor.

2. In Column 14, Line 41, delete "1" and insert -- I --, therefor.

3. In Column 14, Line 42, after "can" delete "should".

4. In Column 20, Line 14, delete "resource" and insert -- resource. --, therefor.

IN THE CLAIMS

5. In Column 30, Line 29, in Claim 1, delete "chose" and insert -- choose --, therefor.

Signed and Sealed this  
Fifth Day of June, 2012

David J. Kappos  
*Director of the United States Patent and Trademark Office*